US 6,642,946 B1

(12) United States Patent
Janes et al.

(10) Patent No.: US 6,642,946 B1
(45) Date of Patent: Nov. 4, 2003

(54) LIVESTOCK INVENTORY AND MATERIALS SYSTEM WITH INTERACTIVE GRAPHICAL USER INTERFACE

(75) Inventors: Lori A. Janes, College Station, TX (US); William C. Miller, III, College Station, TX (US); Alan R. Davidson, Bryan, TX (US)

(73) Assignee: The Cattleman's Resource, Inc., College Station, TX (US)

( * ) Notice: Subject to any disclaimer, the term of this patent is extended or adjusted under 35 U.S.C. 154(b) by 0 days.

(21) Appl. No.: 09/373,927

(22) Filed: Aug. 12, 1999

Related U.S. Application Data

(60) Provisional application No. 60/096,536, filed on Aug. 13, 1998.

(51) Int. Cl.[7] ................................................ G09G 5/00
(52) U.S. Cl. ........................ 345/854; 345/853; 345/769; 345/962; 345/841
(58) Field of Search ................................. 345/853, 854, 345/769, 962, 841, 804; 705/8, 7, 28, 29, 22; 700/90, 213, 214, 216

(56) References Cited

U.S. PATENT DOCUMENTS

| 4,015,366 A | * | 4/1977 | Hall, III ........................... 47/1 |
| 4,288,856 A | | 9/1981 | Linseth ......................... 364/567 |
| 4,597,208 A | | 7/1986 | Chevillot ....................... 40/301 |
| 4,617,876 A | | 10/1986 | Hayes .......................... 119/155 |
| 5,008,821 A | | 4/1991 | Pratt et al. .............. 364/413.01 |
| 5,315,505 A | | 5/1994 | Pratt et al. .............. 364/413.01 |
| 5,351,644 A | | 10/1994 | Everett ...................... 119/14.01 |
| 5,424,957 A | | 6/1995 | Kerkhoff et al. ............. 364/479 |
| 5,450,317 A | * | 9/1995 | Lu et al. ...................... 364/402 |
| 5,457,627 A | | 10/1995 | Cureton et al. ............. 364/401 |
| 5,592,606 A | * | 1/1997 | Myers ......................... 345/356 |
| 5,619,555 A | | 4/1997 | Fenton et al. .................. 380/67 |
| 5,623,589 A | | 4/1997 | Needham et al. |
| 5,673,647 A | | 10/1997 | Pratt ........................ 119/51.02 |
| 5,701,137 A | * | 12/1997 | Kiernan et al. |
| 5,714,971 A | | 2/1998 | Shalit et al. |
| H1743 H | * | 8/1998 | Graves et al. ......... 364/479.06 |
| 5,803,906 A | | 9/1998 | Pratt et al. ................... 600/300 |
| 5,838,319 A | | 11/1998 | Guzak et al. |
| 5,910,803 A | * | 6/1999 | Grau et al. .................. 345/357 |
| 5,923,328 A | * | 7/1999 | Griesmer ..................... 345/854 |
| 6,259,448 B1 | * | 7/2001 | McNally et al. ............ 345/348 |

FOREIGN PATENT DOCUMENTS

EP  0 749 081 A1  12/1996

OTHER PUBLICATIONS

Microsoft Windows 95, Whole Document, pp. 1–95, 1981–1995 Microsoft Corporation.*

* cited by examiner

Primary Examiner—Kristine Kincaid
Assistant Examiner—Mylinh T Tran
(74) Attorney, Agent, or Firm—Wei Wei Jeang; Munsch Hardt Kopf & Harr, P.C.

(57) ABSTRACT

A livestock and material inventory system having a database storing inventory data, at least one data explorer operable to access predetermined portions of data in the database, and a graphical user interface operable to display data accessed by the at least one data explorer to a user is provided. The graphical user interface includes a first window operable to display a hierarchical tree structure representation of the inventory data, and a second window operable to display a data summary associated with a selected node in the hierarchical tree structure.

89 Claims, 16 Drawing Sheets

*FIG. 2A*

| Item & Status | Head... | Detail Avg Weight | Activities Tot Weight | Item Only Summary Status | Status Only Summary In Date | Birth Date |
|---|---|---|---|---|---|---|
| Bulls | 3 | 567 | 1701 | Not-Breedi... | 5/6/98 | 9/8/97 |
| Cows | 4 | 400 | 1600 | Bred | 5/6/98 | 12/30/95 |
| Cows | 1 | 400 | 400 | Lost-Missing | 5/6/98 | 12/30/95 |

Inventory View: Location
- USA
  - Texas
    - Panhandle
      - Bobs Place
      - High Country Pasture
    - Hill Country/Central
    - South Texas
  - Oklahoma
    - Big A Ranch
    - Tri-X Ranch
    - Twin Peaks
  - Florida
  - Wyoming
    - G4F Ranch
      - Back Pasture
      - Front Pasture
  - Colorado
  - Nebraska
  - Kansas Inventory as of Date: 5/16/98   Inventory to View: Livestock File  Lists
Explorer  Vendors  Inventory  Customers

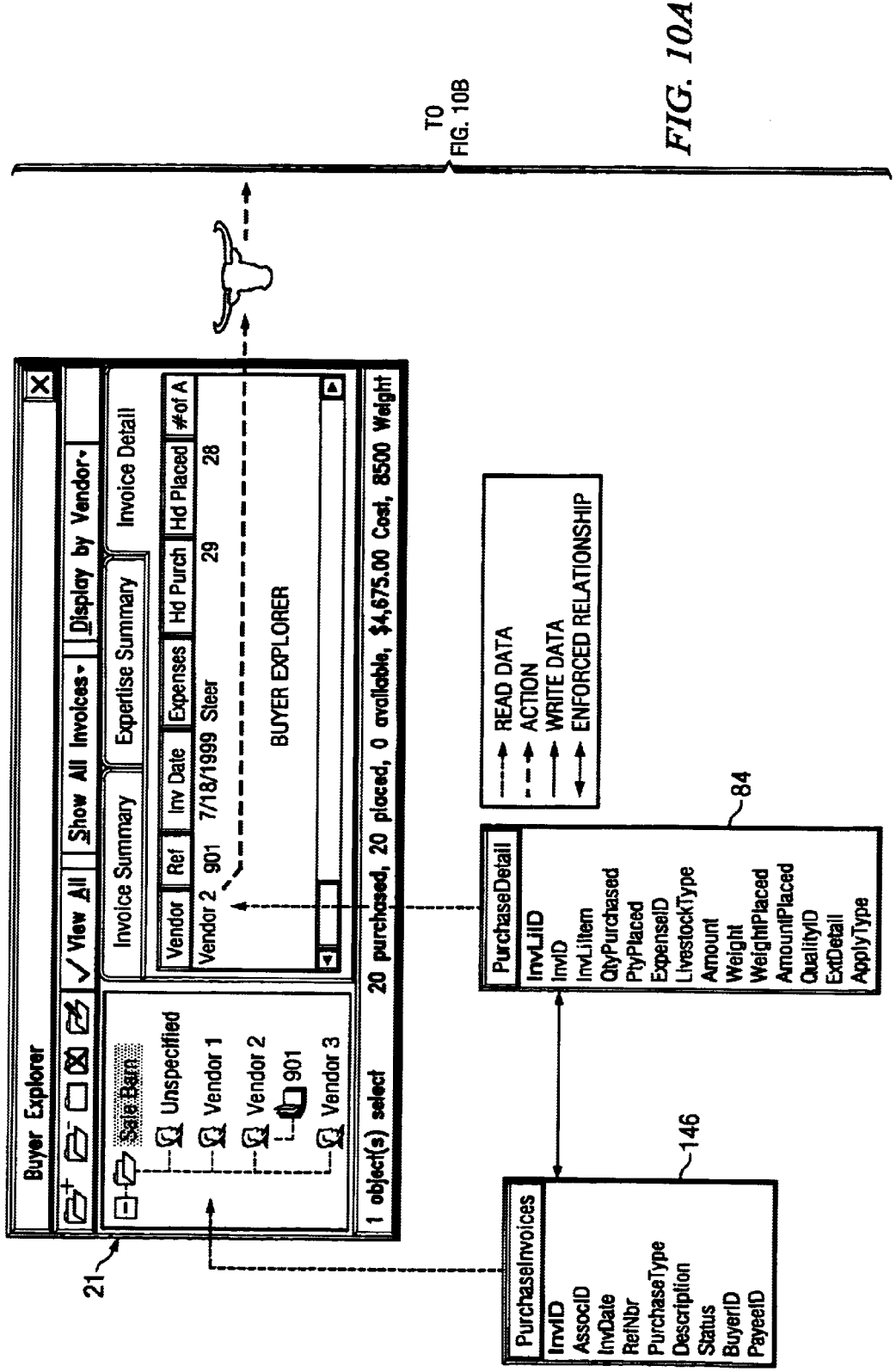

LIVESTOCK INVENTORY AND MATERIALS SYSTEM WITH INTERACTIVE GRAPHICAL USER INTERFACE

RELATED PATENT APPLICATION

This patent application claims the benefit of provisional application Serial No. 60/096,536, titled Livestock Inventory and Materials System Driven From a Hierarchical Tree Graphical User Interface, filed on Aug. 13, 1998.

TECHNICAL FIELD OF THE INVENTION

This invention is related in general to the field of computer software, and more particularly, to a livestock inventory and materials system with an interactive graphical user interface.

BACKGROUND OF THE INVENTION

When managing livestock and materials used by livestock, it is imperative but extremely difficult to keep an inventory system current and accurate. The conventional inventory system uses a text-based user interface that typically involves a menu of inventory activities, for example, animals movements, incoming animals, outgoing animals, incoming materials, and material usage. Both livestock and materials inventories can be quite complex. For example, livestock inventories must accurately represent the type of animal, and its breed, sex, origination, age, size, and many other characteristics in addition to current and past locations. To know what animals and materials are at what locations, for example, the user must either run a paper report or look up the current inventory on a screen, and then switch to an activity entry menu or screen to enter the movement or other required activity. When the user is entering the activities he/she is no longer able to see the inventory. After entering the activity, the user must return to the inventory report or screen again to verify that the activity just entered was processed correctly by pulling the correct item from a first location and moved (in example of the movement activity) the item to the correct second location. Multiple reports including summaries and detail of both source location and destination location must be run and laid next to each other to understand the overall hierarchical relationships of the inventories as well as the detailed information.

With some activities, characteristics of livestock also changed during the activity and therefore the user must run even more reports to view the inventory from various views and characteristics (again, summary and detail of multiple characteristics) to verify that the activity was input and processed correctly. All of these user interactions must be done to verify just a single entered activity. With this conventional approach, inventory maintenance is extremely time consuming and the inventory is often inaccurate or not up to date.

These conventional systems typically require a user with strong computer skills to use and maintain the inventory. Therefore, often the person that manages the inventories must fill out paper forms which are then given to the computer-skilled person to input. The computer-skilled user then reconciles the data and may have to call back to the manager for more information if the reported activities have errors. The inventory manager then must verify the resulting current inventory for accuracy. This process results in more inaccuracy and double or triple the man-hours. Further, the inventory manager does not know the current inventory until the computer-skilled office personnel enters the data and obtains an updated report to the inventory manager. Therefore, the inventory manager often does not have the most up to date view of the inventory available.

In summary, livestock managers were limited by inaccurate inventories for which the staff was spending a large effort attempting to maintain.

SUMMARY OF THE INVENTION

Therefore, a need has arisen for a system and method of livestock and material inventory tracking and management that provides an interactive graphical user interface that not only provides the user different views or data summaries of the data, but also allows the user to easily change the data to reflect completed business transactions and also to enter new data. It is desirable for the user to see the current data at all times while he/she is changing data or entering new data. It is also desirable to allow the user to easily change the criteria and scope for the data to be displayed.

In one aspect of the invention, an interactive graphical user interface window of a livestock and materials inventory system includes a first window operable to display a hierarchical tree structure representation of inventory data, and a second window operable to display a data summary associated with a selected node in the hierarchical tree structure.

In another aspect of the invention, a livestock and material inventory system comprises a database storing inventory data, at least one data explorer operable to access predetermined portions of data in the database, and a graphical user interface operable to display data accessed by the at least one data explorer to a user. The graphical user interface includes a first window operable to display a hierarchical tree structure representation of the inventory data, and a second window operable to display a data summary associated with a selected node in the hierarchical tree structure.

In yet another aspect of the invention, a method of tracking livestock and materials inventory includes the steps of selecting a business application environment, selecting a data explorer having access of specific predetermined sets of data in a database, organizing and displaying the accessed data in a hierarchical tree structure in a first window following a selected organizational criteria and in response to the selected business application environment, selecting a node of the hierarchical tree structure, and displaying data summaries associated with the selected node in a second window.

A technical advantage of the present invention is the interactive graphical user interface that not only displays the data in a user-specifiable organizational manner, but also allows the user to easily enter a business transaction by drag and drop methods. The graphical user interface allows the user to set and change any number of criteria for displaying and summarizing the data. A further technical advantage of the present invention is the multi-tiered and modular architecture of the system that allows future business applications and data explorers to be developed with substantially shortened development time. A generic data explorer object is used to instantiate function-specific data explorers so that the data explorers share common properties and provide a common and seamless presentation to the user.

BRIEF DESCRIPTION OF THE DRAWINGS

For a more complete understanding of the present invention and advantages thereof, reference is made to the accompanying drawings, in which:

FIGS. 2A–2J are embodiments of graphical user interfaces according to the teachings of the present invention;

FIGS. 10A and 10B are diagrams showing an embodiment of the drag and drop method according to the teachings of the present invention.

DETAILED DESCRIPTION OF THE INVENTION

Figure 1:
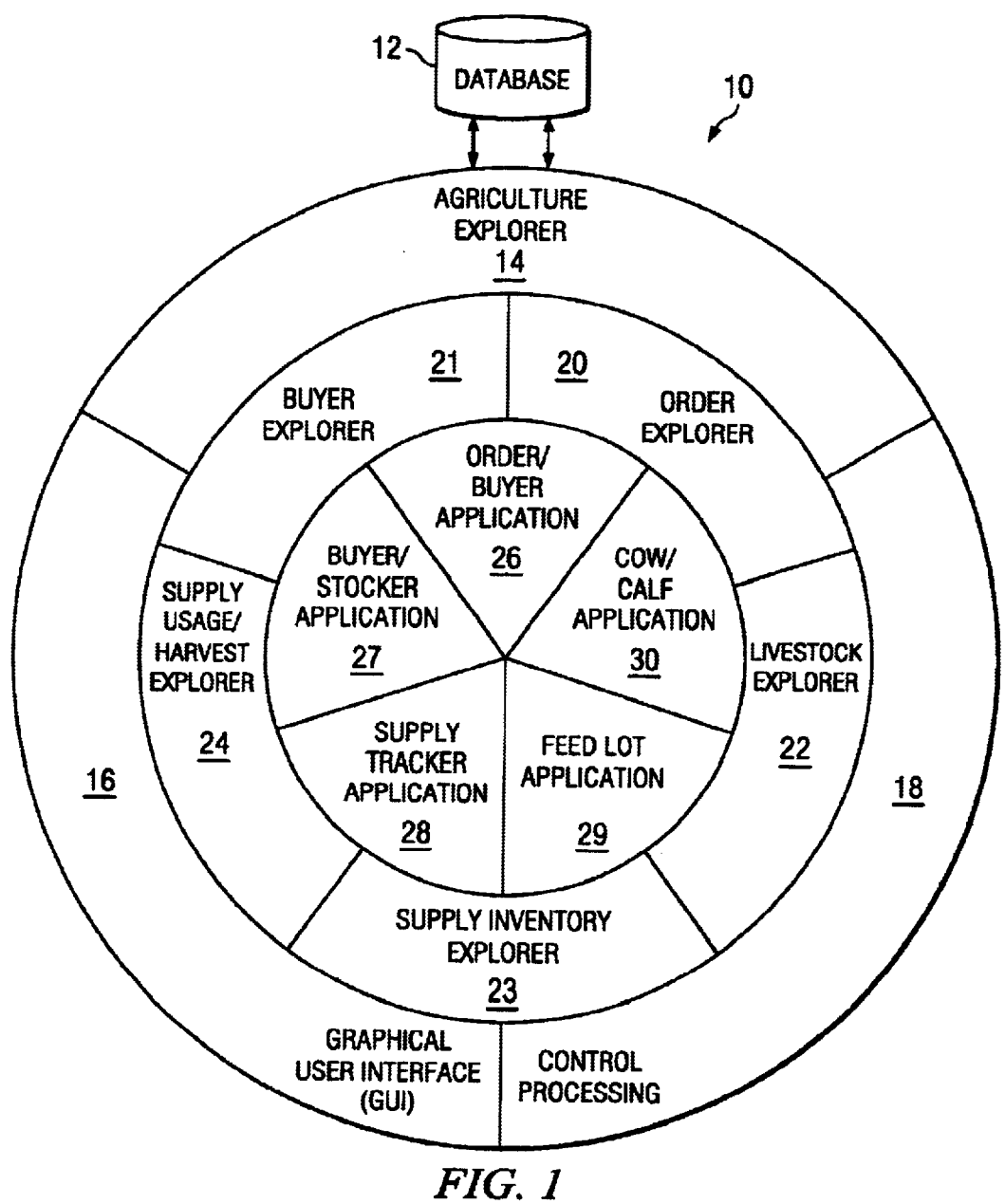
FIG. 1 is a functional block diagram of the livestock and materials inventory system and method according to the teachings of the present invention.
Figure 2B:
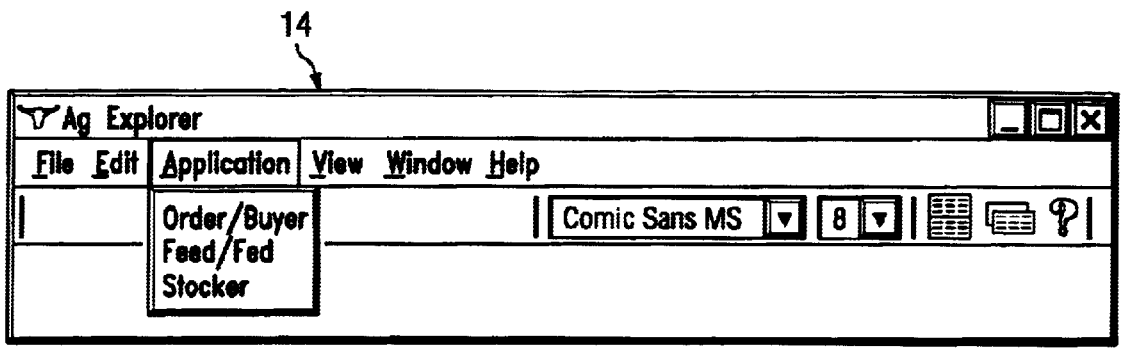
Figure 2C:
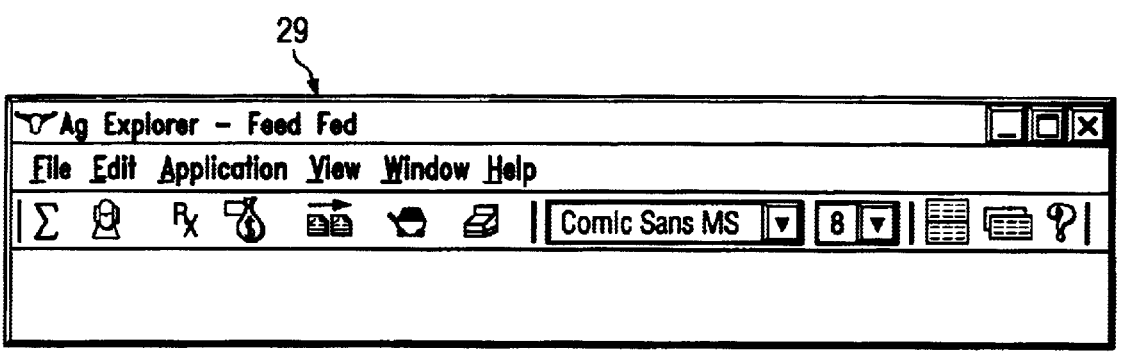
Figure 2D:
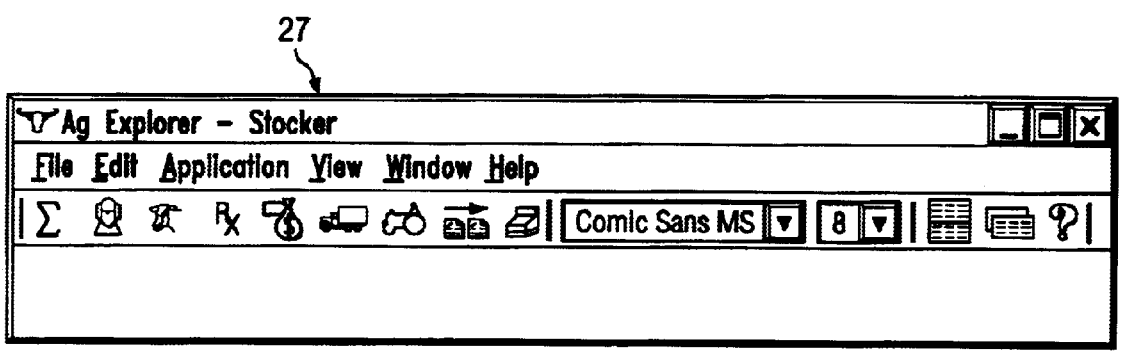
Figure 2E:
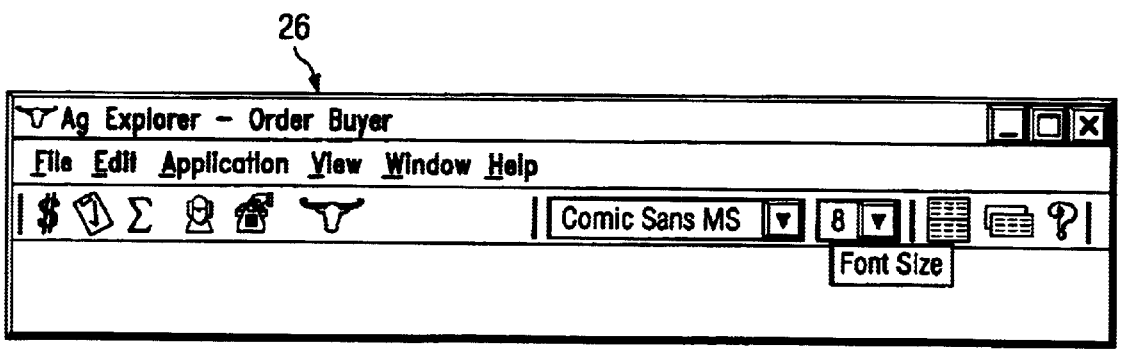
Figure 2F:
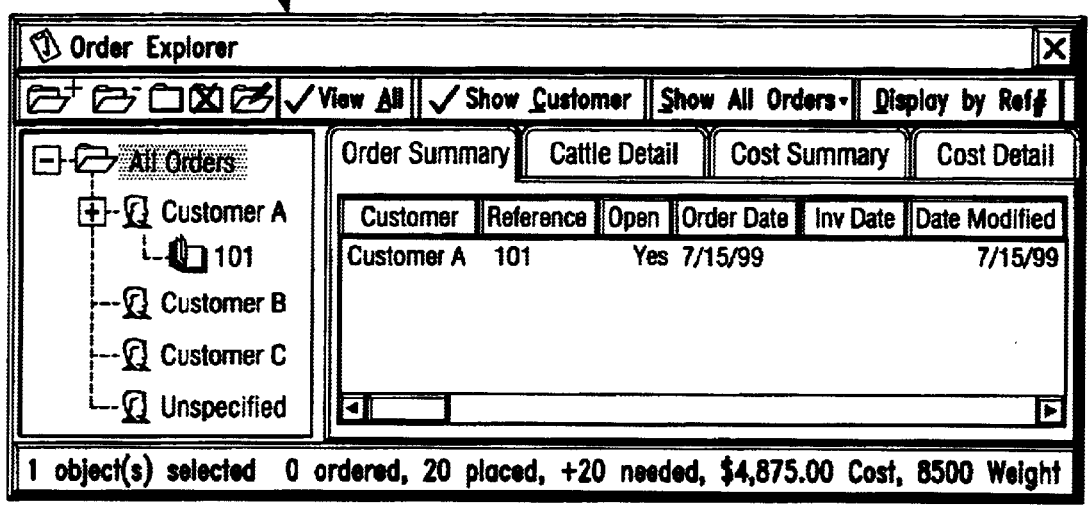
Figure 2G:
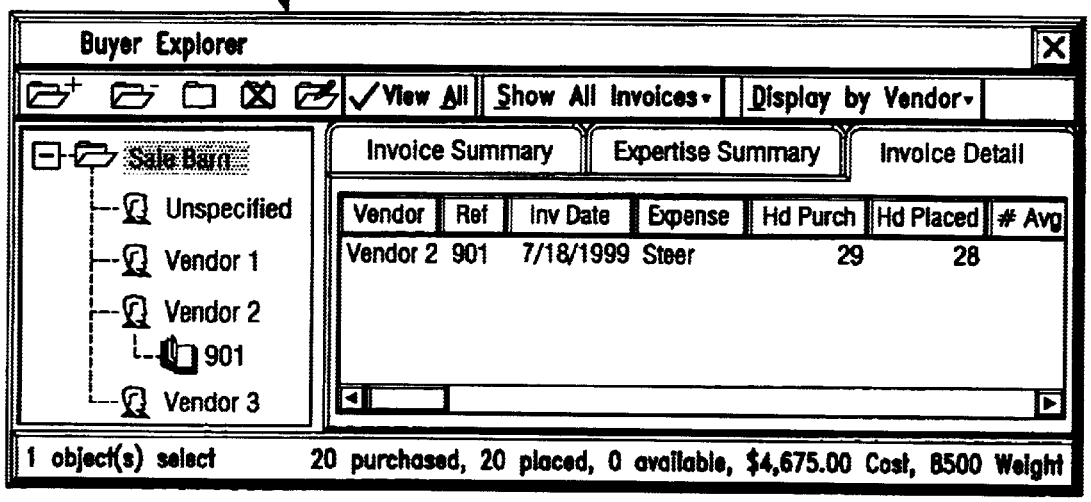
Figure 2H:
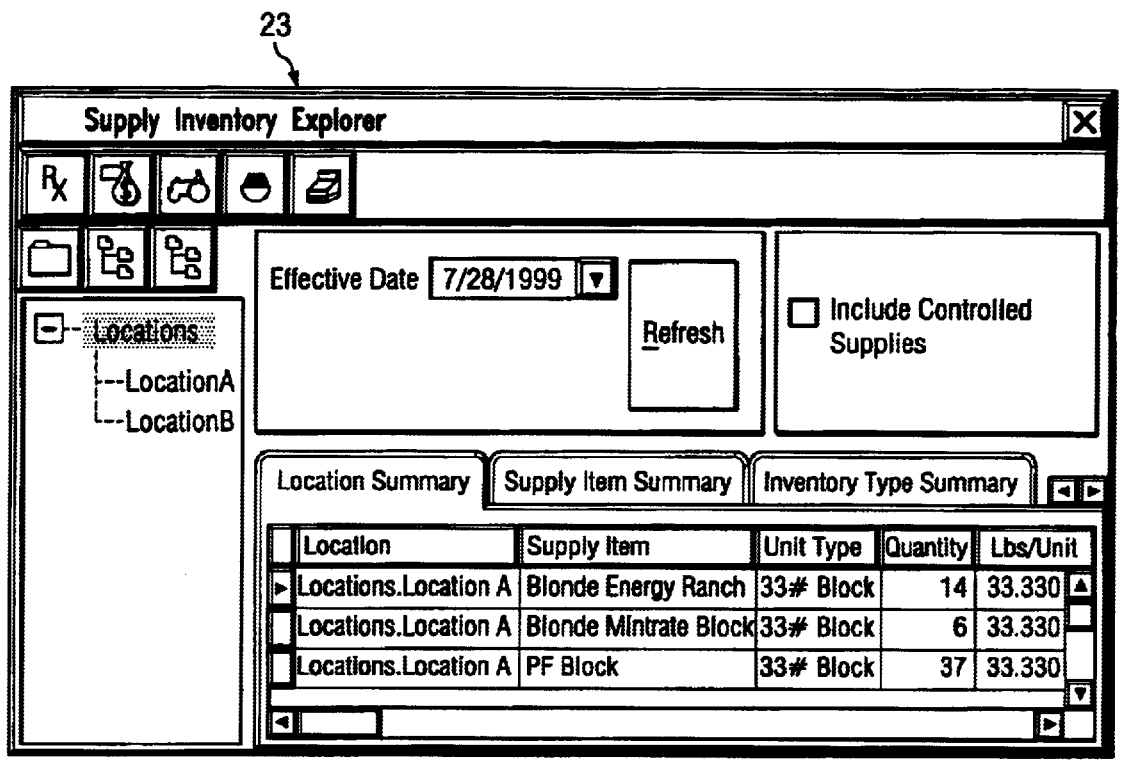
Figure 2I:
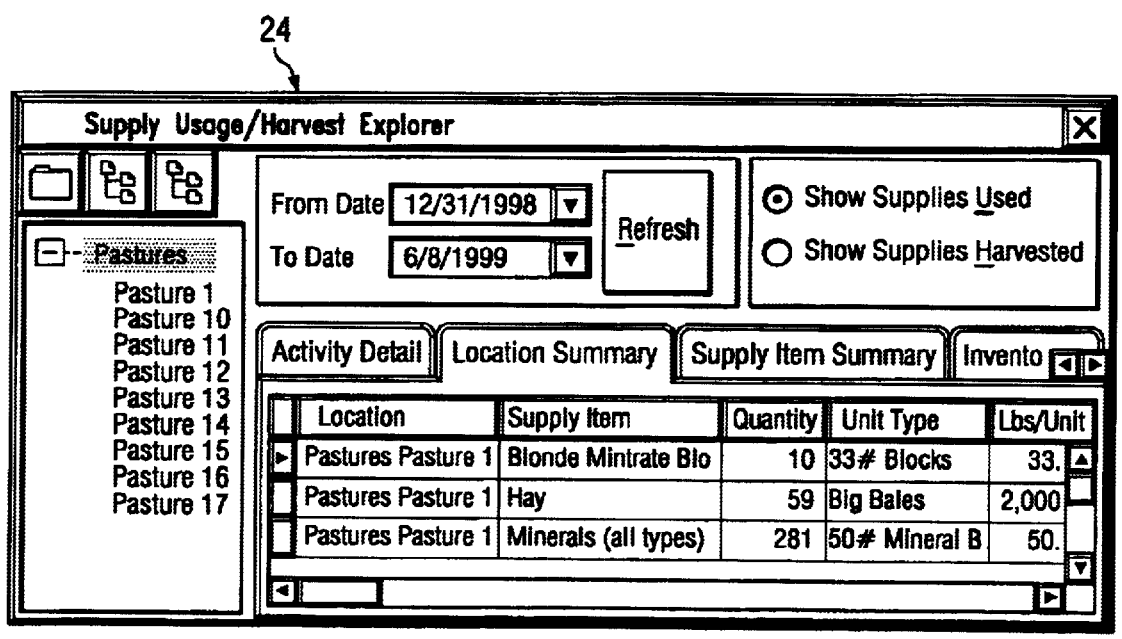
Figure 2J:
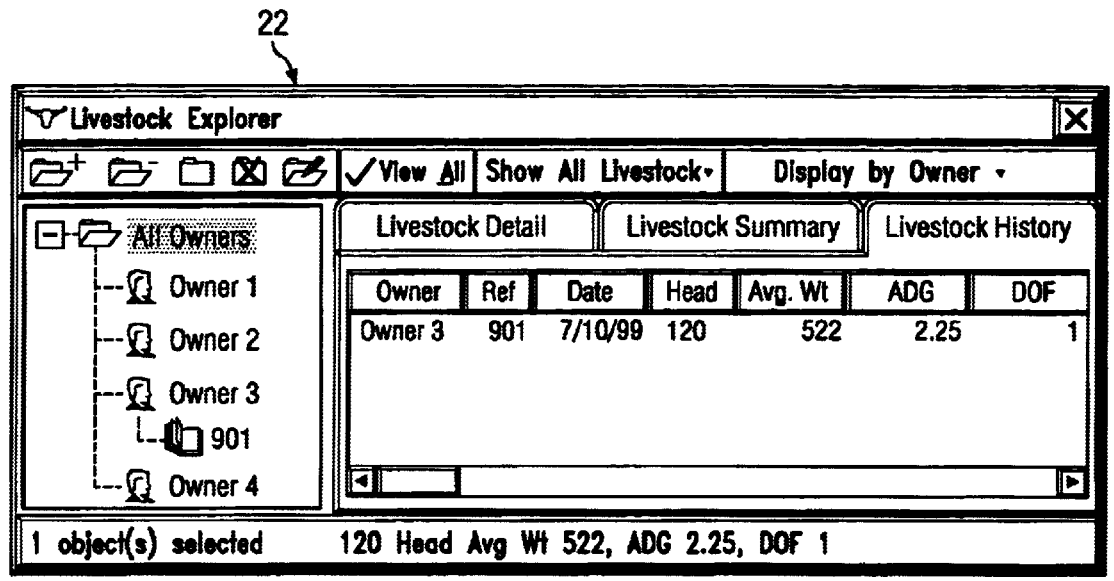

FIG. 1 is a block diagram of the livestock inventory and materials system 10 of the present invention. System 10 includes a database 12 that stores all the data related to the user's agricultural business. Database 12 may be implemented as a relational database, object-oriented database, relational object-oriented database, or in any suitable technology and architecture. Agriculture explorer 14 is an umbrella process or environment that includes a number of data explorers 20–24 that may be used for many different agricultural and ranch business applications 26–30. Data explorers 20–24 access and provide different slices of data stored in database 12 so that the data is presented in a manner that makes sense for the particular business application. The user is able to look at and navigate around various aspects of the data with the simple clicks of a mouse button.

Data explorers 20–24 include order explorer 20, which, is a process that provides data summaries associated with customer orders. Buyer explorer 21 is a process that provides data summaries associated with invoices and purchases. Buyer explorer 22 thus allows a user to access and view livestock and material purchase transactions. Livestock explorer 22 is a process that provides data on livestock by location, type, owner, or history, etc. Supply inventory explorer 23 is a process that provides data summaries of movement activities (e.g. incoming, outgoing, harvest, movements in, movements out, purchase, apply, sell) associated with supplies. Supply usage/harvest explorer 24, on the other hand, is a process that provides data summaries associated with the usage and harvest of supplies.

Business applications in which the data explorers may be used include order-buyer business application 26, which provides data summaries associated with customer orders as well as invoice purchases of buyers from vendors. The user may use order-buyer application 21 to find, buy, and resell cattle to other livestock businesses. It may be noted that order-buyer application 21 is a combination of order explorer 20 and buyer explorer 22 and accesses and presents data used in both business applications. Buyer-stocker business application 27 may use a combination of livestock, buyer, supply inventory and supply usage/harvest explorers to keep livestock inventory and track purchases, feeding, treatment and sale of livestock. Supply tracker business application 28 may use a combination of the supply inventory and supply usage/harvest explorers to track supply inventory and supply usage. Feed-lot business application 29 may use a combination of the livestock, supply inventory, supply usage/harvest, and buyer explorers to track livestock inventory to final fed-weight, custom feeds, and treatments within a feed lot. Cow-calf business application 30 may use a combination of the livestock, buyer, breeding, and supply explorers to track breeding and production inventory and feeding at a breeding ranch.

When a data explorer is used in the context of a, business application, the data presented in the data explorer is adapted so that it is meaningful in that context. The data explorers each provides access to or view of specific well-defined portions of database 12 that are meaningful for the specific business applications. For example in an order-buyer business application, livestock is purchased and immediately applied directly to a sale. Therefore, because in the order-buyer business application, livestock stay in physical inventory for only a short period of time, just using a physical inventory viewer alone that looks at more permanent inventory such as the livestock explorer is not useful or meaningful.

Livestock inventory and materials system 10 has a second component that includes a graphical user interface (GUI) 16 that provides a window-based interface with a menu bar with drop-down lists, a tool bar, clickable icons and buttons, a hierarchical tree structure, and tabbed pages displaying data summaries. Details of graphical user interface are described below in conjunction with references to FIG. 2.

A third component of livestock inventory and materials system 10 is the control and processing modules 18 that store and process data based on user initiated events or user-entered data. Depending on the specific data explorer environment that is currently active, the user's input is processed according to the business rules of the active business application. Therefore, the same user input may generate two different results in two different business application environments. Details of control and processing modules 18 are described below.

Referring to FIG. 2A for an exemplary screen print 40 of an exemplary data explorer showing some of the common graphical user interface elements shared by all the data explorers. Screen print 40 shows what a cow-calf explorer graphical user interface may look like. The graphical user interface may include a number of pull-down lists 42–44. Pull-down list 42 provides the user the capability to select the inventory view, which may be by location, owner, animal type, age, sex, breeding status, weight group, or other user-defined criteria. Pull-down list 43 provides the user the capability to select the as of date for the data shown. Pull-down list 44 provides the selection of which inventory to display, which may include livestock, materials or both. Such pull-down lists may be used to limit or focus the data displayed in a hierarchical tree data structure 46 displayed in a left-hand panel or window 47. For example, hierarchical tree data structure 46 shows a breakdown of geographical locations since that is what is selected in pull-down list 42.

It may be noted that USA is the top node, which has seven branches denoting states (Texas, Oklahoma, Florida, Wyoming, Colorado, Nebraska, and Kansas). Some of the states or branches are further broken down into regions such as Texas, and other states are terminal nodes such as Florida. Some regions are even further broken down into multiple sub-regions or ranches/pastures, such as the Panhandle of Texas is broken down into Bob's Place and High Country Pasture. Therefore, hierarchical tree data structure 46 includes a top node, with one or multiple branches, each of which may include zero, one or more sub-branches and/or leaves (terminal nodes). The number of branching and the number of levels of branching are not limited. Each node with sub-nodes may be displayed as expanded (those noted with a "−" symbol) or contracted (those noted with a "+" symbol).

In the right-hand panel or window 48, tabbed data summary pages 50 are displayed. Tabbed data summary pages 50 may present details and summaries of data represented in various ways, including tables, charts, graphs, maps, images, videos, and other data representations. Pull-down list 44 may also be used to limit or focus the data displayed in right-hand panel 48. The user-selected livestock inventory as of May 16, 1998 for the location selected or highlighted (or noted by the pointing hand cursor) in left-hand panel 47 is displayed in tabbed data summary pages 50. Because the G4F Ranch node of Wyoming is selected in hierarchical tree data structure 46, the livestock inventory for that location is displayed in right-hand panel 48. The inventory displayed is attributable to both the front and back pastures of the G4F Ranch, because the G4F Ranch can be further broken down into the front pasture and the back pasture, and that the G4F Ranch, not an particular sub-region, is selected. If the user so desires, he/she may view livestock inventory of the specific pasture by selecting it in the hierarchical tree data structure. Similarly, if the top node (USA) is selected, all livestock at all locations are displayed in the right-hand panel. Therefore, the selection of the node in the hierarchical tree data structure determines the scope of the data displayed in the tabbed data summary pages.

Tabbed data summary pages 50 includes multiple pages of data that can be "flipped" to by selecting or clicking on the respective tabs. The same data focused and narrowed by the pull-down lists and hierarchical tree node selection is shown on the various tabbed pages in a number of ways. Therefore, the inventory data can be summed, subtotaled, and selectively displayed in the various tabbed pages. For example, if the Item/Status Tab is activated, the inventory item details and the status of the inventory item are summed. The displayed head count and average weight columns then represent the total head and average weight across all livestock with equal description and status and are located in any sub-level of the active level.

Clickable buttons 52 are also provided to allow the user to select specific inventory activities, such as moving livestock or other inventory from one location to another. Control and processing modules 18 also simplifies this process by allowing the user to pick up inventory from one location and drop it in another location (or from one data explorer to another data explorer) using a drag and drop technique. The drag and drop technique and other details of control and processing modules 18 are described below.

FIGS. 2B–2E are exemplary screen prints of the graphical user interface of agriculture explorer 14 with different selected business application environments including feed fed 29, stocker 27, and order-buyer 26. It may be seen that the tool bar icons have been changed to reflect the nature and needs of the selected business application. The user may then select the data explorer with which he/she desires to view the data. FIGS. 2F–2J are exemplary screen prints of the graphical user interface of various data explorers—order explorer 20, buyer explorer 21, supply inventory explorer 23, supply usage/harvest explorer 24, and livestock explorer 22. The data explorer windows are laid inside the agriculture explorer window, and may be configured in a number of ways, such as tile, cascade, etc. Appendix A includes a list of the types of data that may be summarized and displayed for each data explorer.

Figure 3:
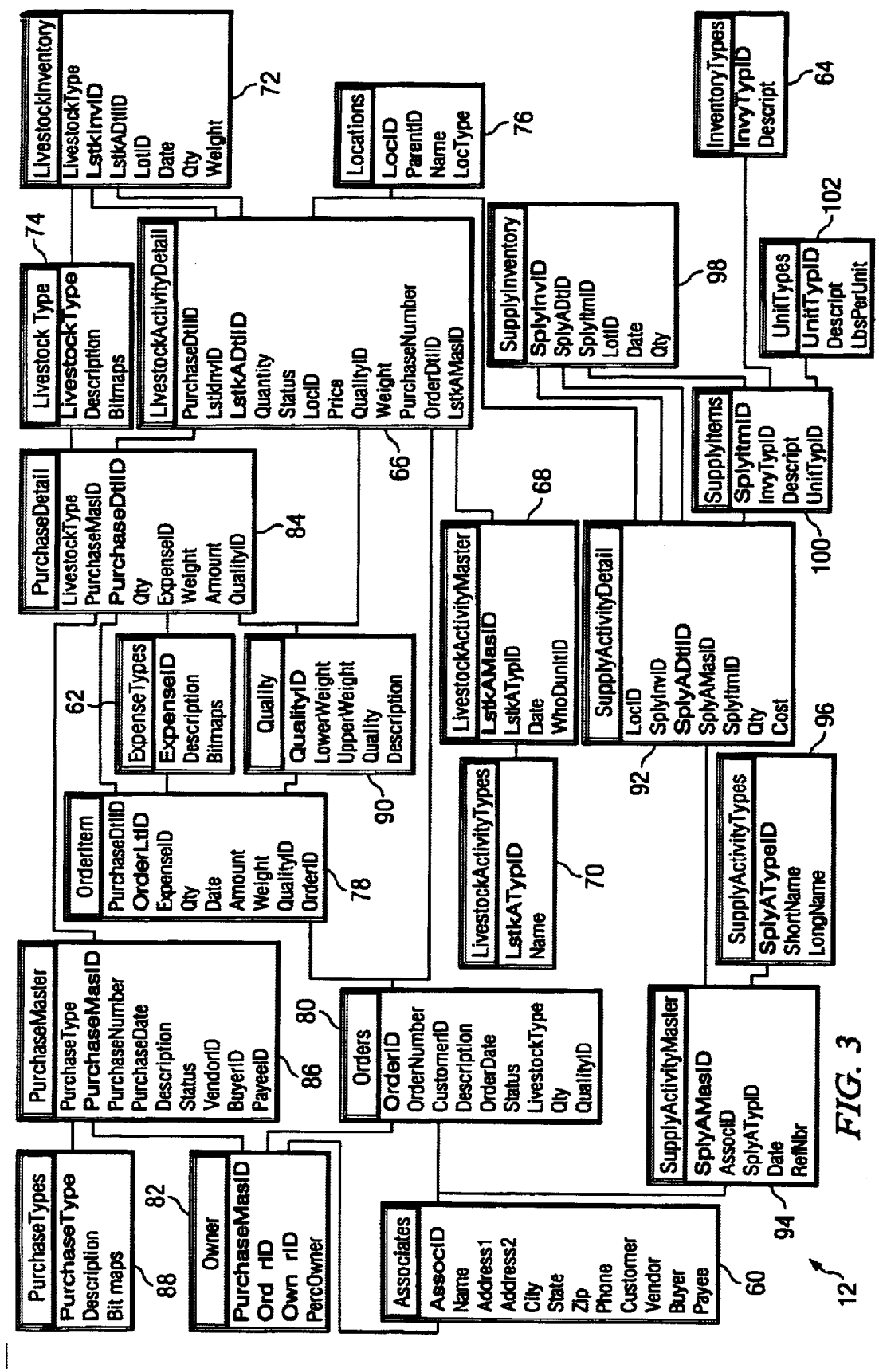
FIG. 3 is a block diagram of an embodiment of the inventory database of the present invention.

FIG. 3 is a block diagram of exemplary tables of database 12 according to the teachings of the present invention. Database 12 is made up of a number of tables which are related to one another, each table storing several fields of related data. Exemplary tables in database 12 may include:

Associates (60)—contains information about all individuals used by the various applications, such as customers, buyers, and vendors ExpenseTypes (62)—types of expenses, such as livestock purchase, freight, medicine etc.

InventoryTypes (64)—types or groupings of inventory

LivestockActivityDetail (66)—Details of livestock transactions

LivestockActivityMaster (68)—Livestock trasactions

LivestockActivityTypes (70)—Types of Livestock transactions

LivestockInventory (72)—Livestock inventory on hand

LivestockType (74)—types of livestock

Locations (76)—locations to put livestock or inventory

OrderItem (78)—details on livestock and expenses applied to fill an order

Orders (80)—what is ordered

Owner (82)—Who owns the livestock

PurchaseDetail (84)—details on what was purchased

PurchaseMaster (86)—purchases (detail of purchase in PurchaseDetail)

PurchaseTypes (88)—type of purchase

Quality (90)—subjective description of the quality of the livestock

SupplyActivityDetail (92)—detailed records of activity (history) of inventory SupplyActivityMaster (94)—transactions SupplyActivityTypes (96)—types of supply activity SupplyInventory (98)—inventory on hand SupplyItems (100)—items that can be in inventory UnitTypes (102)—by pound, or by the bale, etc.

The relational links between the various tables are shown in FIG. 3. The following provides examples of some of the main tables (in addition to shared supporting tables like Associates, Locations, etc.) may be accessed by each data explorers:

Order Explorer—Orders and OrderItem tables

Buyer Explorer—PurchaseMaster table and the PurchaseDetail table

Figure 5:
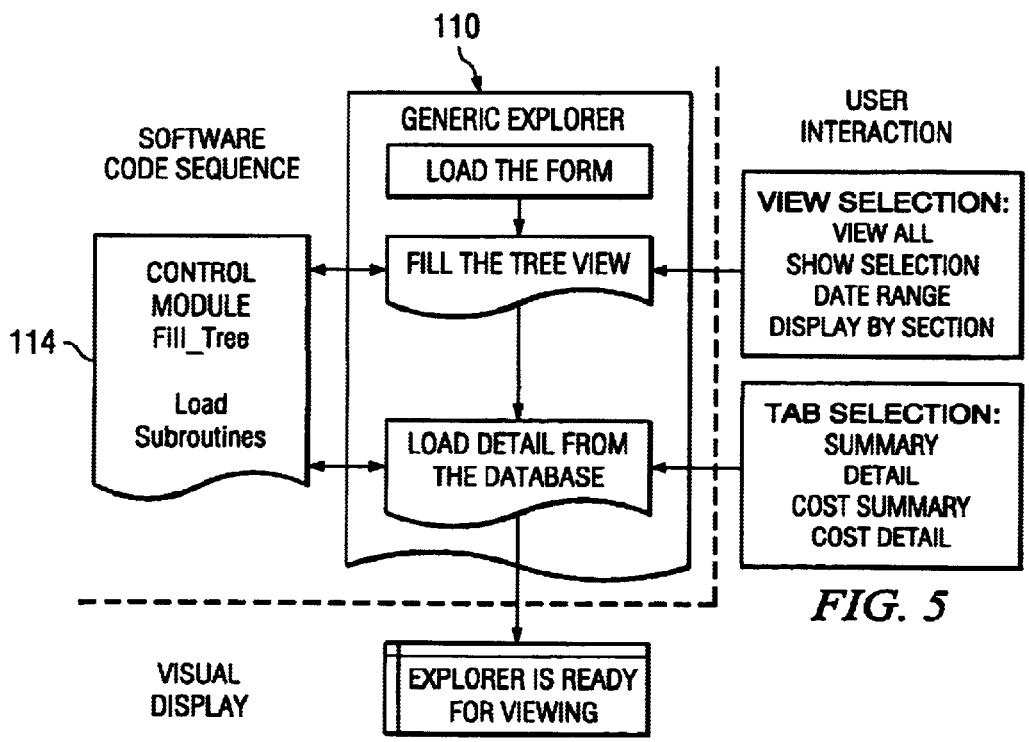
FIG. 5 is a flow diagram of an embodiment of a control and processing portion of the present invention.
Figure 4A:
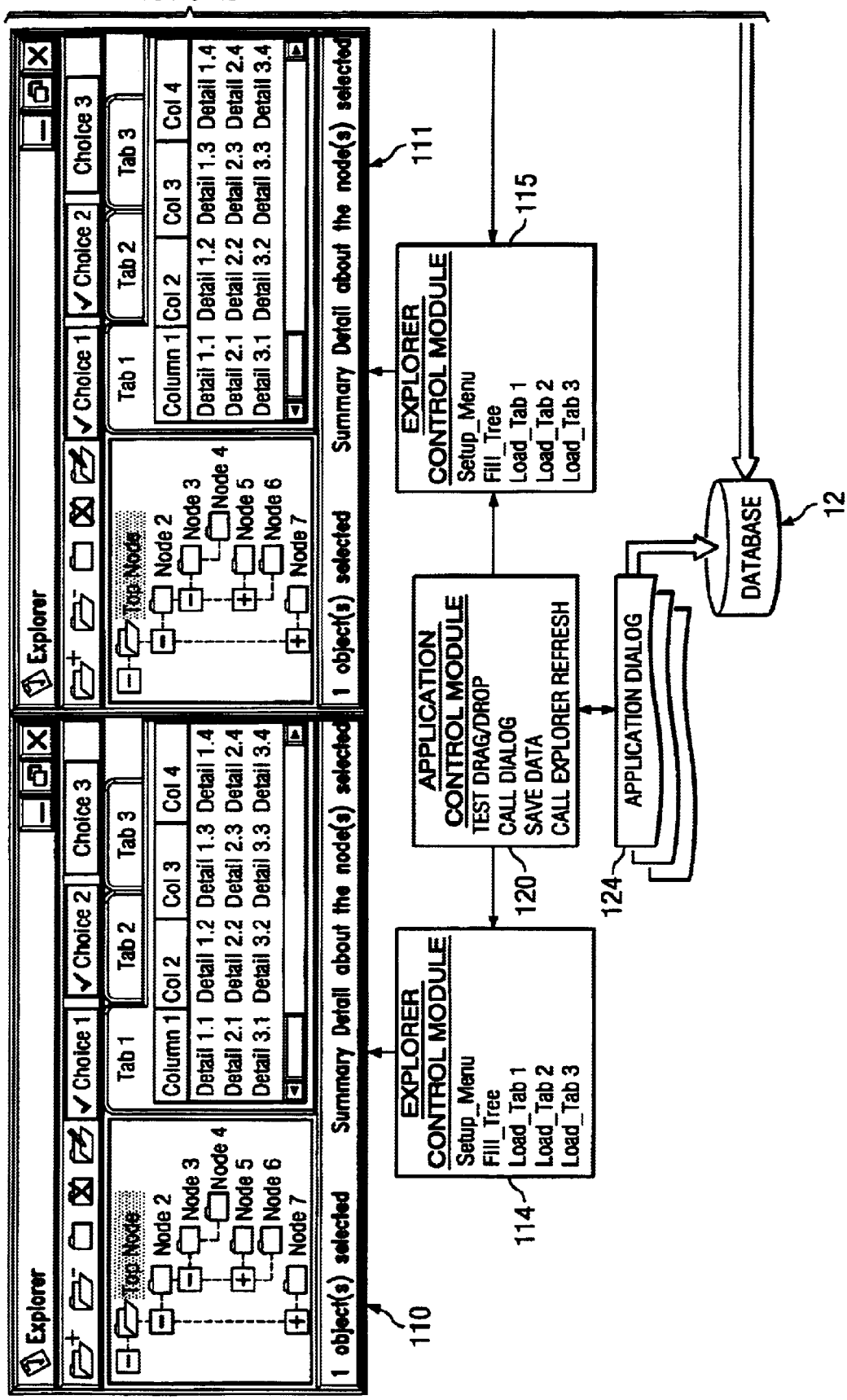
FIGS. 4A and 4B are functional block diagrams showing the multi-tiered architecture of the present invention.
Figure 4B:
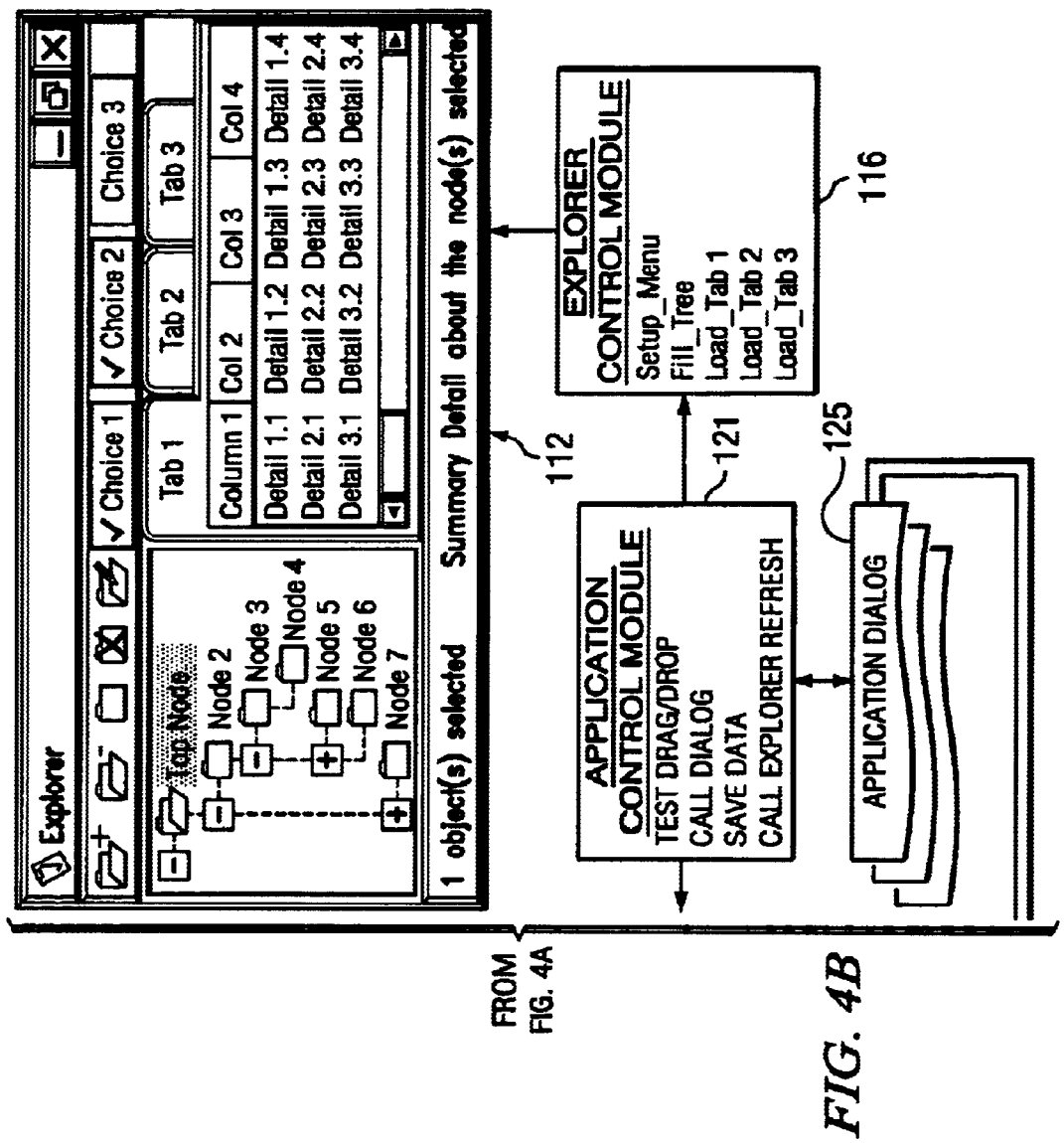
Figure 9:
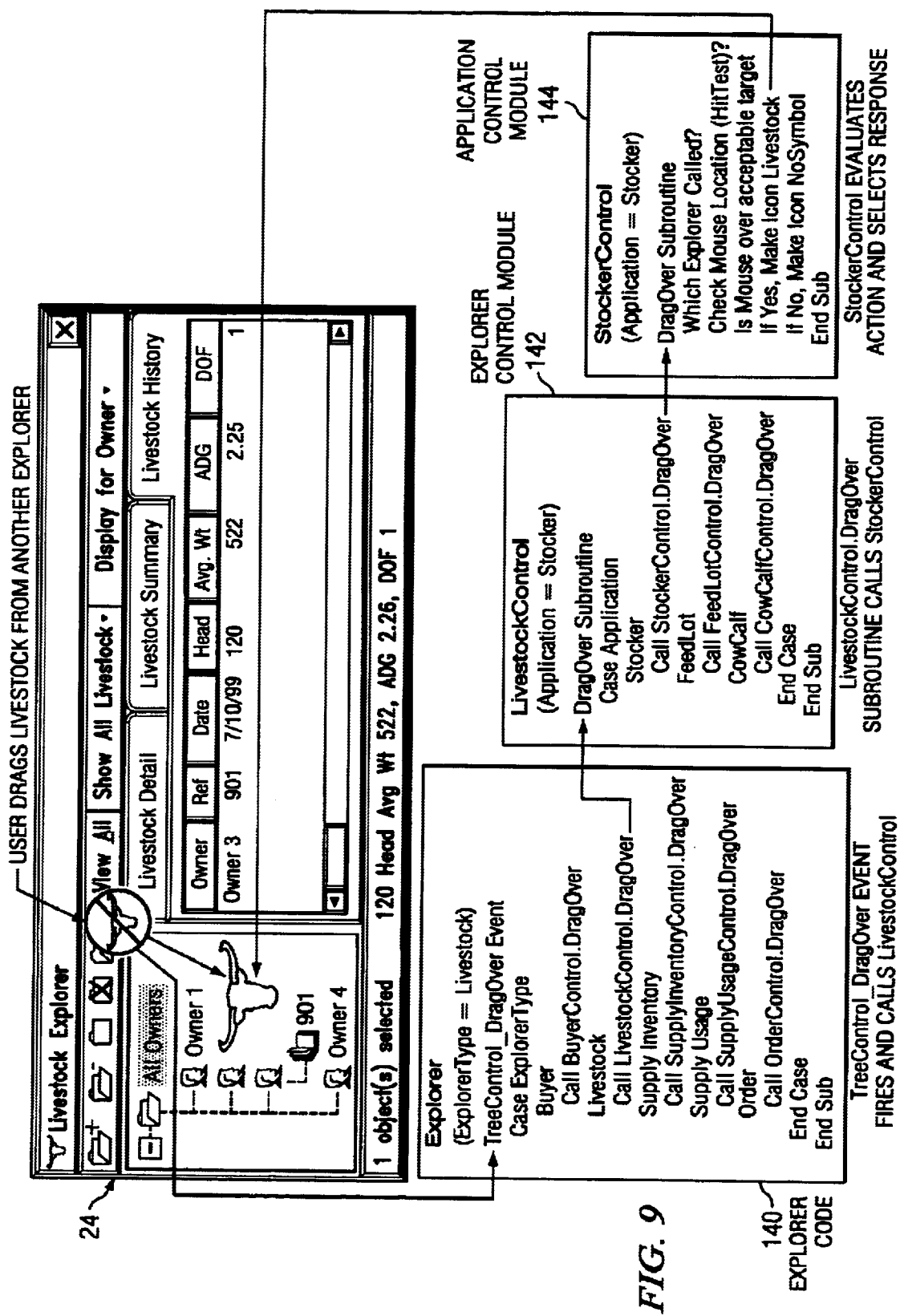
FIG. 9 is a flow diagram showing an embodiment of the control and processing portion of the present invention.

Supply Inventory—SupplyActivityMaster, SupplyInventory, and SupplyActivityDetail tables Supplies Usage/Harvest—SupplyActivityMaster and SupplyActivityDetail tables Livestock Explorer—LivestockActivityMaster, LivestockInventory, and LivestockActivityDetail tables FIGS. 4A and 4B diagrams showing the multi-tiered architecture of system 10 according to the teachings of the present invention. The data explorers such as buyer 22, livestock 24, order 20, supply inventory 25, and supply usage/harvest 26, etc. are constructed from instances 110–112 of a common generic explorer object. The generic explorer is defined to have a set of graphical user interface properties, such as a title bar, a tool bar, clickable icons and/or buttons, a left panel that provides an hierarchical tree-structured view of the data, and a right panel that provides detailed information on a specific node of the tree such as shown in FIG. 2. Each data explorer has an underlying control module 114–116 with the appropriate functions to create the associated function-specific explorer from the generic explorer object. For example, an OrderExplorer control module 114 has the specific methods or steps to build an order explorer instance 110 of the generic explorer object. Thus, the user can dynamically open multiple data explorers to gain different insight into the data. Referring also to FIGS. 5 and 9, generic data explorer 110 may be configured according to the specific events or methods specified in explorer control module 114. When the user opens an explorer of a particular function or for a particular business application, a specific series of events or methods of explorer control module 114 is called. For example, a Form_Load event is called to retrieve window configuration and settings (block 140). Setup_Menu is also called to determine and display the available button and pull-down list selections. Form_Load then calls a Fill_Tree method that loads the hierarchical tree structure in the left panel (block 142). Fill_Tree then calls the selected (or default) Load-Tab routines which load the right panel with tabbed pages of information, as shown in block 144. To speed up execution, only the data associated with the selected or the default (usually the leftmost tab) tab pages is loaded.

Figure 6:
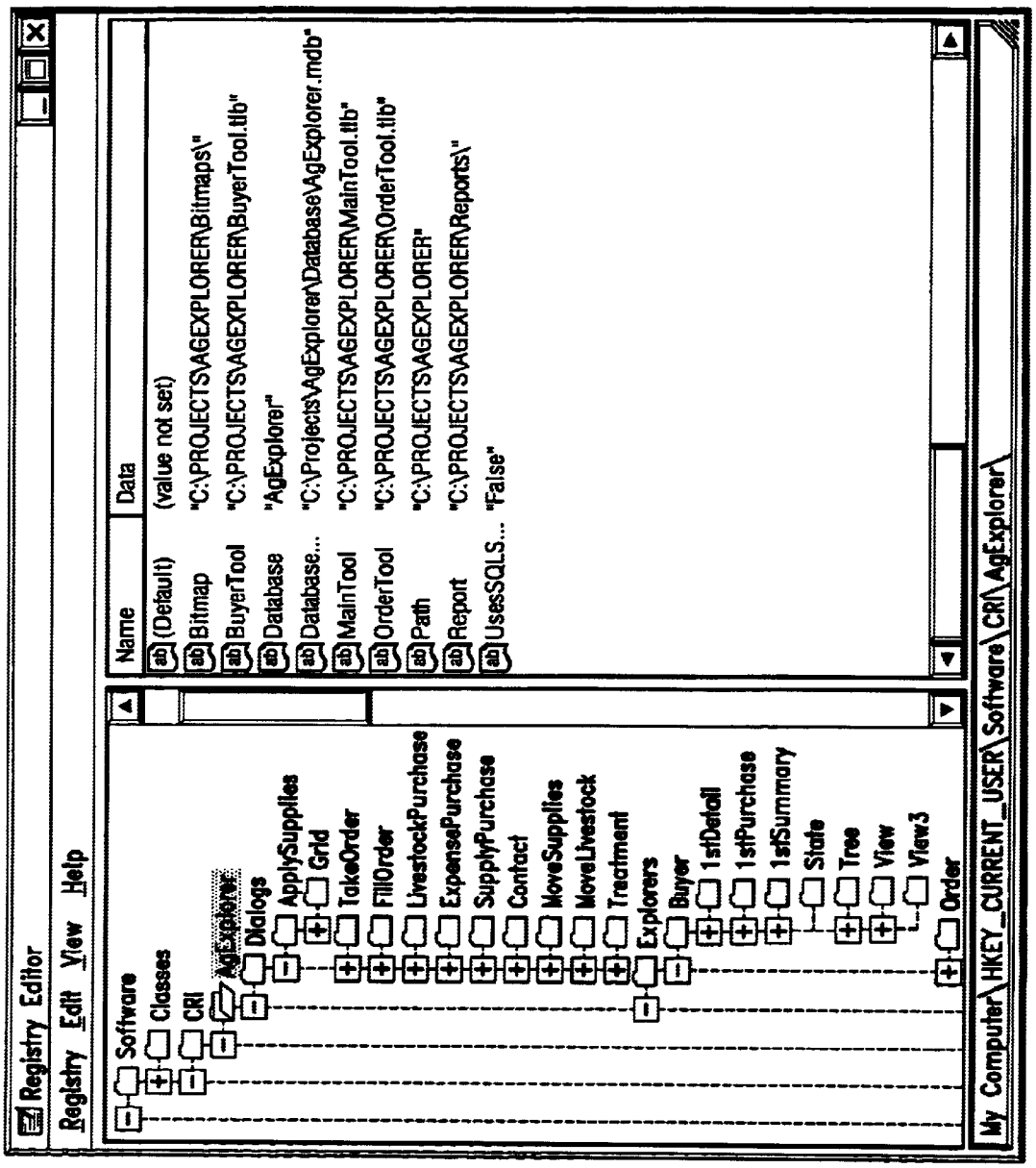
FIG. 6 is a graphical user interface showing an embodiment of a Windows registry according to the teachings of the present invention.

In particular, when Order Explorer is opened, for example, the Form_Load event calls a function named Read_Registry that reads Windows (95, or 98) registry values, an example of which is shown in FIG. 6. The Windows registry contains information on the visual attributes that the user is able to set and change, such as the position and size of the left and right panels or the sizes of various columns in the tabbed pages in the right panel, etc. This information is stored for each data explorer. The Read_Registry function is passed the data: Key to Read, Value to Read, Create If Doesn't Exist, Default value. Read_Registry returns the data found in the Windows registry, or if no data was found it returns the default value. The Order Explorer may repeatedly call the Read_Registry function to determine the last state of the View All, Show Customer, Show Orders, Display By, and the right panel tab controls, such as SSTab, a software program provided by Sheridan Software Systems, Inc. of Melville, N.Y.

Figure 7:
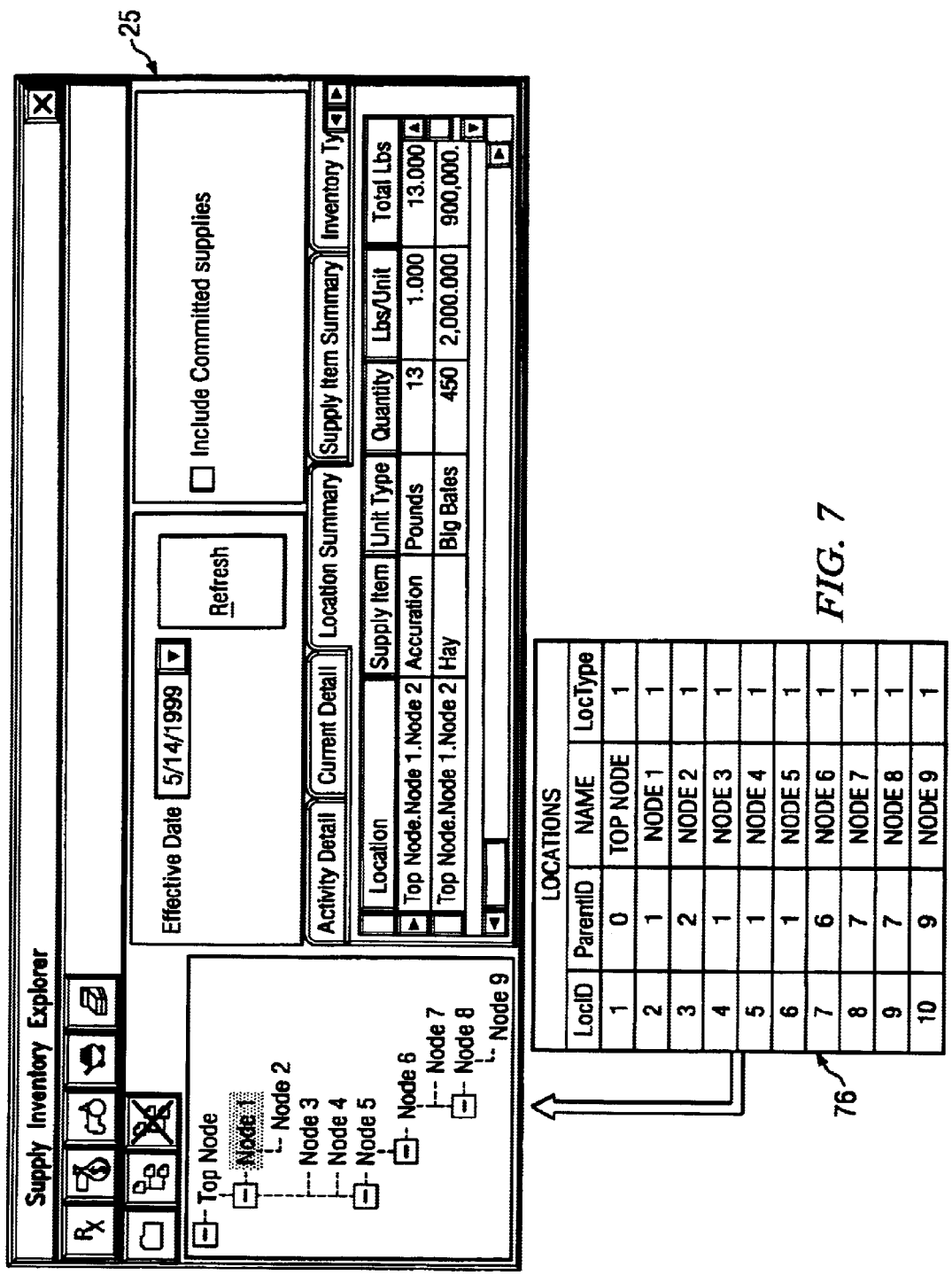
FIGS. 7 and 8 are diagrams showing the population of the hierarchical tree structure according to an embodiment of the present invention.
Figure 8:
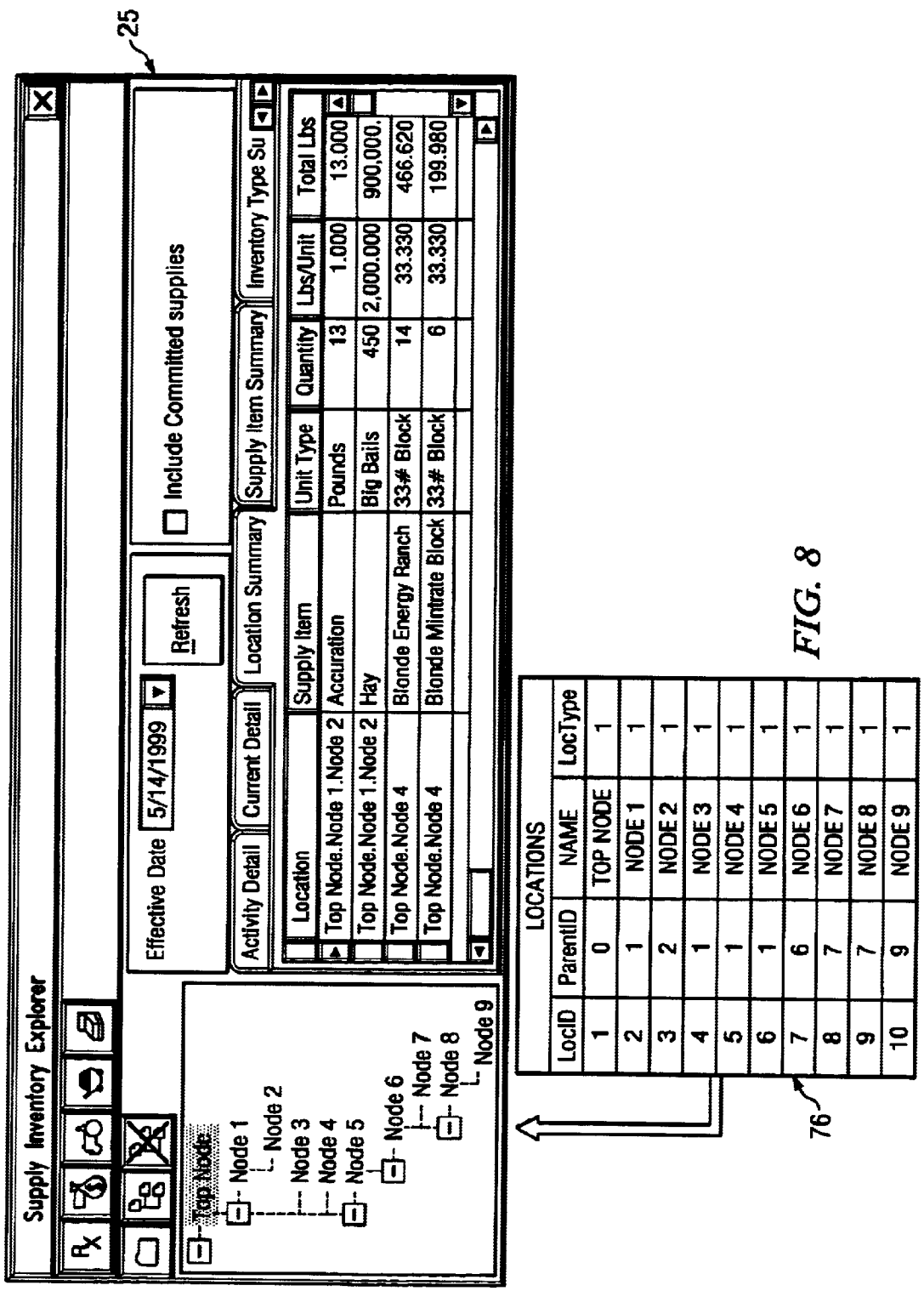

The Form_Load event then calls the Fill_Tree subroutine. The Fill_Tree subroutine accesses Locations table 76 (FIG. 3) to obtain parent and child information to build and populate the tree control in the left panel of the active data explorer. An example of a tree structure and its associated location table is shown in FIGS. 7 and 8. Note in FIG. 7, only the details of the selected branch is shown in the right panel, and in FIG. 8, all the data associated with the top node is displayed in the right panel. The left panel tree hierarchy can be configured according to user specifications. The bottom-most nodes (terminal nodes) of any branch are the only nodes, in that branch, that may contain data. This means that while one branch of the tree may go through four levels to reach the terminal nodes, another branch may only have two levels. In the various database tables the relationship between nodes is saved. For example, the field ParentID in the Locations table contains the LocID (LocationID) of the Parent of a node. In the case of the Supply Inventory Explorer, for example, the Fill_Tree subroutine queries the Locations table joined to the SupplyInventory table. The resulting record set contains the ParentID for each record. The top node will have a 0 (for this invention we set the field to default to 0, but start numbering all indexes at 1, so that 0 is in effect No ID) for its ParentID, but all other nodes will have a parent location's LocID as its ParentID. The Fill_Tree method loops through the record set and populates one branch at a time by finding the next lower node using the ParentID field, until all the branches are built.

The Fill_Tree subroutine loads and sets the state of the control. The sequence is as follows. First turn redraw off, clear all nodes, and choose either a set of large icons, or a set of small icons for the tree (according to registry entry). Next build the SQL (standard query language) query for the tree. The SQL query is built according to the selections made on the explorer tool bar. For example, for the Order Explorer, the user may indicate if all customers are to be shown in the left panel, or just customers with orders.

In the Order Explorer example, the join function is made between the Associates table and either the Orders table, the OpenOrders view of the Orders table (all records where the Status is Open), or the Closed Orders view of the Orders table (all records where the Status is Closed). The Associates table contains information on all individuals (customers, buyers, vendors etc.) so the query is limited to customers only in its WHERE clause. An example of the resulting exemplary query for all orders and.,showing all customers is:

SELECT Associates.AssocID, Associates.Name,
Associates.Address1, Associates.Address2,
Associates.City, Associates.State,
Associates.Zip, Associates.Phone,
Associates.Customer, Associates.Vendor,
Orders.OrderID, Orders.RefNbr,
Orders.DateOpened, Orders.Description FROM,
Associates LEFT JOIN Orders ON
Associates.AssocID=Orders.AssocID WHERE
Associates.Customer=Yes ORDER BY
Associates.Name ASC, Orders.DateOpened Asc The record set that is returned by this query is used to populate the hierarchical tree structure. The Top node is added. Each node has a key (a unique identifier for the node), text (to display), relative, and relationship. Each node's position in the tree hierarchy is established by entering another node's Key as its relative, and listing the other node as a parent, child, or sibling. The nodes are created using the tree control's Add method. The subroutine loops through the record set from beginning to end, and adds a second level node for each customer if the Show Customers option has been selected. The level is set by using Top (the key for the top node) as the relative property (to refer to the top node), and child as the relationship (to indicate that the customer node is a child of the top node). Similarly the orders made by each customer are added as child nodes of the customer node. All nodes other than the top node are assigned a number as their key in order as the key is created (1, 2, 3, and so on). Additionally all nodes have an optional DataKey, which is a non-unique value used to further describe the node. This application assigns actual IDs to the DataKey property for each node other than the top node. Each customer node has the DataKey set to its AssociateID, and each order node's DataKey is the. OrderID. Each level of node is also assigned icons for its non-selected, selected, and expanded states. The text used for the Customer level is the customer name. The text used for the order level is either the RefNbr (Reference number) or the Description from the record set depending on whether the user has selected Display by Reference or Display by Description. If the customer had previously selected a node the value is read from the registry and that node is set as the selected node, otherwise the top node is set as the selected node and this is recorded in the registry. Now that the selected item has been set, the tool tips for the five tree tools can be set. The tools may include:

Expand All Nodes

Collapse All Nodes

Add (i.e. Add a Customer, Add an Order)

Delete (i.e. Delete this Customer, Delete this Order)

Edit (i.e. Edit this Customer, Edit this Order)

The last step taken in the Fill_Tree subroutine is a call to one of the Load subroutines to load detailed data for display into the right panel. The specific Load routine is determined by the tab property of the tree tab control which indicates the current or active tab on the user's screen. The right panel view is loaded using information from the left panel selection to limit its results. The tree is used to build a record set of the OrderIDs of all terminal nodes of the selected branch, and this record set is joined to the Load query that is used to retrieve the data for the selected tab in the right panel. Thus, the detailed data displayed in the right panel are limited according to the node selection in the left panel. Each node that is added programmatically to the left panel has several methods and events that are used within the program, as well as built-in behavior. By clicking on the "+" symbol next to the node the immediate children of that node are displayed (expanded), and by clicking on the "−" symbol next to an expanded node the node's children are hidden (collapsed). All other visual behavior of the nodes is handled programmatically, for example, the user can click on a selected node's text, and edit it which results in an After-LabelEdit event firing where the change can be validated and saved. If the user clicks on the Expand All icon, the program loops through all the nodes in the tree and sets the expanded property to true. The program controls the various properties of each node, such as the icon that represents the node, and how the lines between the nodes are drawn.

Referring to FIG. 5, in the case of the Order Explorer, four different Load subroutines are used to load the four tabbed views available in the right panel. The Fill_Tree subroutine calls the Load subroutine for the active tab or the default tab. If a user clicks on a different tab to change the view the active tab (the tab property) for the tab control is automatically set to the tab the user choose, and the Tab_Click event fires. In the Tab_Click event a case structure calls the Load subroutine for the tab chosen.

In the Order Explorer example, the right panel contains various views of Orders table 80 and OrderItem table 78 (FIG. 3), which contains detailed information about the cattle, and other expenses that have been applied to each order. An OrderID links the Orders table with the OrderItem table. The right panel of the Order Explorer may contain four tabs, where each tab contains a different view of the data contained in the two tables. The information may be read from multiple tables and is retrieved using SQL query to join the Orders table to the OrderItem table by the field OrderID. Thus the details about the expenses applied to an order is combined with the information about what was ordered, and then displayed to the user.

The first tab in the right panel of the Orders Explorer, Order Summary, contains a one line summary of the order and its status. The information is created by both an aggregate (summary) query which totals all costs from the OrderItem table, and a join with the order information in the Orders table to create a single summary record showing what has been placed on the order and what was ordered. The second tab, Cattle Detail, contains a one line summary for every group of cattle used to fill the order. Cattle from several sources may be used to fill the order, and each group has a separate record in the OrderItem table. The OrderID attribute joins the tables, but an additional restriction is used in the SQL query—only records from the OrderItem table that refer to cattle are joined to the Orders table. The third tab, Cost Summary is similar to Order Summary except that the costs are totaled by expense type rather than making one grand total. Expense types include livestock purchase, freight, medicine, commission etc., and can be customized by the user. One line per expense type is displayed in the Cost Summary view. The fourth tab, Cost Detail, contains one line for each applied cost, including livestock. The behavior of the tabs according to the selected node is shown below:

| Tab | Top Node | Customer Node | Order Node |
| --- | --- | --- | --- |
| Order Summary | all orders | selected customer orders | selected order |
| Cattle Detail | all orders | selected customer orders | selected order |
| Cost Summary | summed across all orders | summed across selected customer orders | summed for the selected order |
| Cost Detail | all lines for all orders | all details for selected customer | all detail for the selected order |

A more complete list of the tables used to create the right panel views (for the Order Explorer) may include PurchaseMaster, PurchaseDetail, ExpenseTypes, OrderItem, Orders, Associates, Quality, and LivestockType.

In the order explorer example, the Load_Summary subroutine loads data into the Order Summary tab, Load_Detail routine loads data into the Cattle Detail tab, Load_CostDetail routine loads data into the Cost Detail tab, and Load_CostSummary routine loads data into the Cost Summary tab.

In the Load_Summary subroutine, the query is built first. The query varies with the selected level of the tree in the left panel. The top level contains information on all orders, the customer level contains information on that customer's orders, and the order level only contains information about the selected order.

The exemplary query built for the view of all orders to show the one line summary may be:

SELECT Associates.Name AS Customer,

Orders.RefNbr AS Reference, Orders.OrderID,

Orders.Status AS Open, Orders.DateOpened AS [Order Date], Orders.DateInvoiced AS [Inv Date], OrderItemTotals.LatestDate AS [Date Modified], LivestockType.Description AS Livestock, Orders.Qty AS [Hd Ordered], Orders.Loads AS [Loads Ordered], Orders.MinWeight AS [Min Wt], Orders.MaxWeight AS [Max Wt], Orders.MaxPrice AS [Max Price], IIf(OrderItemTotals.TotalApplied Is Null,0, orderItemTotals.TotalApplied) AS [Hd Applied], IIf (OrderItemTotals.TotalWeight Is Null,0, OrderItemTotals.TotalWeight) AS Weight,
IIf(OrderItemTotals.TotalApplied>0, OrderItemTotals.TotalWeight/OrderItemTotals.TotalApplied,0) AS [Avg Wt], IIf(OrderItemTotals.TotalAmount Is Null,0, OrderItemTotals.TotalAmount) AS Cost,
Quality.Description AS Quality,
Orders.Description AS Description
FROM Quality RIGHT JOIN (LivestockType INNER JOIN ((Orders INNER JOIN Associates ON Ortders.AssocID=Associates.AssocID) LEFT JOIN OrderItemTotals
ON Orders.OrderID=OrderItemTotals.ID) ON LivestockType.LivestockType=Orders.LivestockType) ON Quality.QualityID=Orders.QualityID
ORDER BY Associates.Name ASC, Orders.RefNbr ASC, Orders.DateOpened ASC;

Please refer to Appendix B for exemplary queries used to populate and repopulate the right panel each time the user alters a selection to obtain the correct and current data from the database.

Referring back to FIG. 4, application control modules 120 and 121 are part of control and processing modules 18 (FIG. 1) and are called by explorer control modules 114–116 to process user input. For example, referring also to FIG. 9, the user may drag a group of cattle from a stocker explorer to a specific owner node in the hierarchical tree structure displayed in a livestock explorer. A portion of agriculture explorer (agriculture explorer) 14 is a TreeControl_DragOver event 140 that fires in response to this user input. Depending on the explorer type, in this case, livestock, the specific explorer control module is called or called. In the example shown in FIG. 9, the DragOver subroutine 142 of a LivestockControl explorer control module is called. Because the current business application is stocker, a StockerControl.DragOver subroutine 144 of the application control module associated with the stocker business application is called by DragOver subroutine 142 of the livestock explorer control module. The DragOver subroutine 144 then determines the explorer environment, determines the mouse location, and determines whether the current mouse location is on an acceptable target location: based on predefined business rules associated with the stocker business application. The DragIcon indicating the mouse location is then made reflective of whether the current location is an acceptable or suitable target. Each data explorer may be assigned a unique tag that allows it to be easily identified. A non-acceptable target is marked by the universal NO symbol indicated by a circle with a slash through it, for example. The informative icons provide the user a visual feedback on whether he can "drop" the dragged inventory. Therefore, as the mouse is passed over the various elements of the graphical user interface, the DragOver event rapidly fires repeatedly or periodically to determine the acceptability of the mouse location.

When he/she drops the inventory on the intended target, the DragDrop event of the tree control fires. The data in database 12 is modified appropriately to reflect the completion of the transaction. In many instances, a dialog box (124, 125; FIG. 4) is displayed to receive any additional required or optional information associated with the transaction and to allow the user to edit the data. The data associated with the transaction are then saved in database 12 in the appropriate tables. The source and target explorer display is refreshed to reflect the updated inventory status.

Figure 10B:
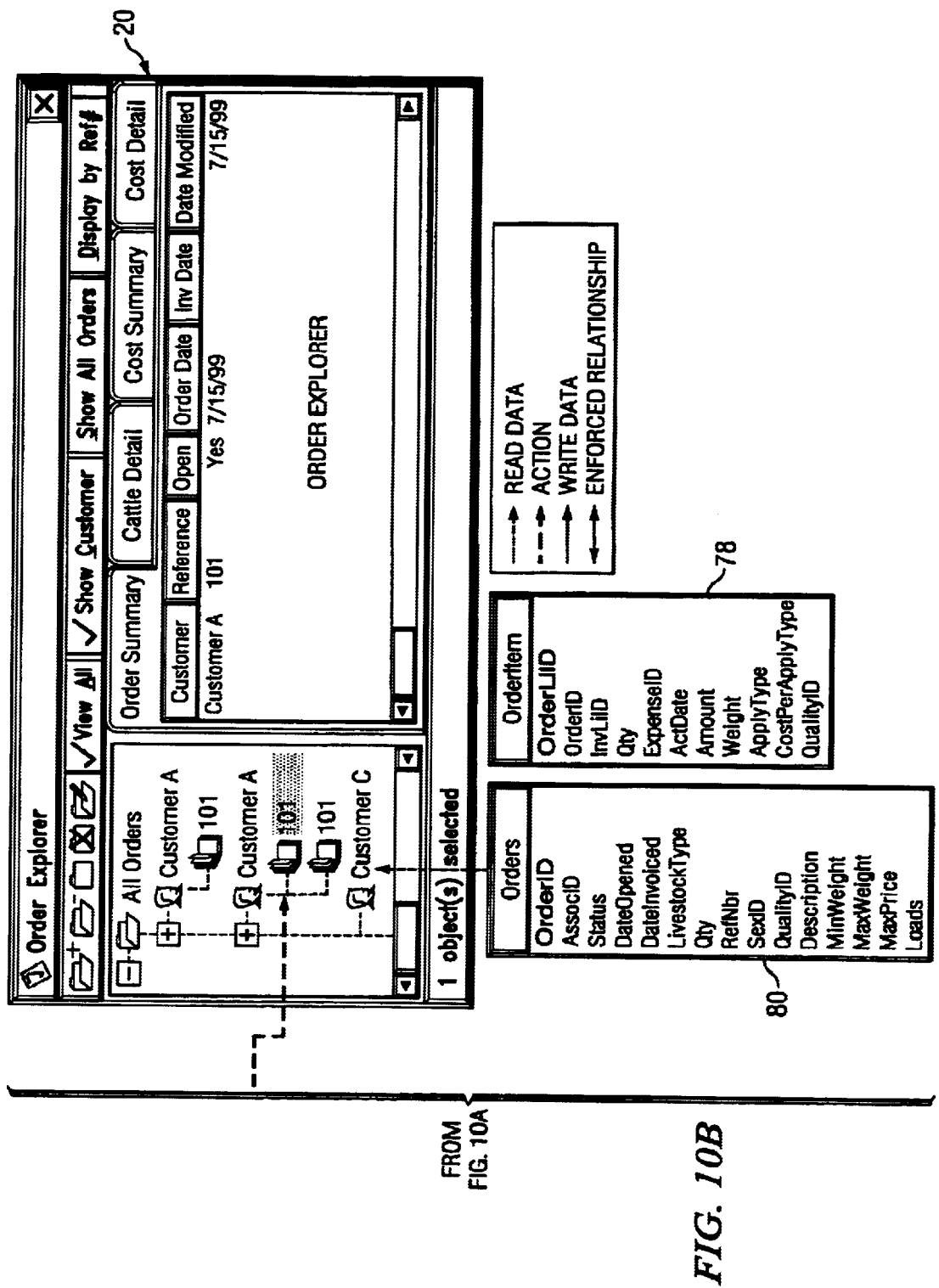

FIG. 10 is an example of the drag and drop technique used in the order-buyer business application between a buyer explorer 21 and an order explorer 20. In the order-buyer business application, livestock is typically bought by a professional buying company and immediately sold to customers to fill an existing order. The user may click on a group of cattle displayed in the right-hand panel of buyer explorer 21 and drag it to the hierarchical tree structure displayed in the left-hand panel of order explorer 20. The DragOver event of the tree control of order explorer 20 (routed to the order-buyer business application control module as shown in FIG. 9) continues to check whether the mouse is over an order in order explorer 20 by using a HitTest method. The HitTest method returns all the attributes or properties associated with the hierarchical tree structure node under the mouse pointer. If the mouse position as given in Cartesian coordinates (X,Y) is over an order (of a particular customer), then the HitTest Level property so indicates.

The HitTest function also returns a DataKey property, which is the OrderID, an unique identifier for the order. The DataKey is used to generate a query of orders table 80 (FIG. 3):

SELECT*FROM Orders WHERE
OrderID="&SSTree.HitTest(X, Y).DataKey to identify the particular order being filled by the drag and drop action. A record set is opened using this query, and the OpenRecordset method of a database object is set to the agriculture explorer database. Only one record is identified by this query, since each order has a unique OrderID. If the livestock type of the order found matches the livestock type dragged from the buyer explorer, then the source DragIcon property is set to a livestock bitmap giving the user visual confirmation that the livestock can be dropped on this order.

It may be noted that the drag and drop method of the present invention may be used to select any displayed element as the data source, whether it be a node of the hierarchical tree structure or a displayed data summary item, to any other displayed element as the data target. Once dropped, the data of the data source is processed or associated with the data of the data target to complete the business transaction. A dialog box may open and be displayed to the user to fill in additional data not already available as part of the data source or data target. The user may also modify the data using.the dialog box.

Figure 11:
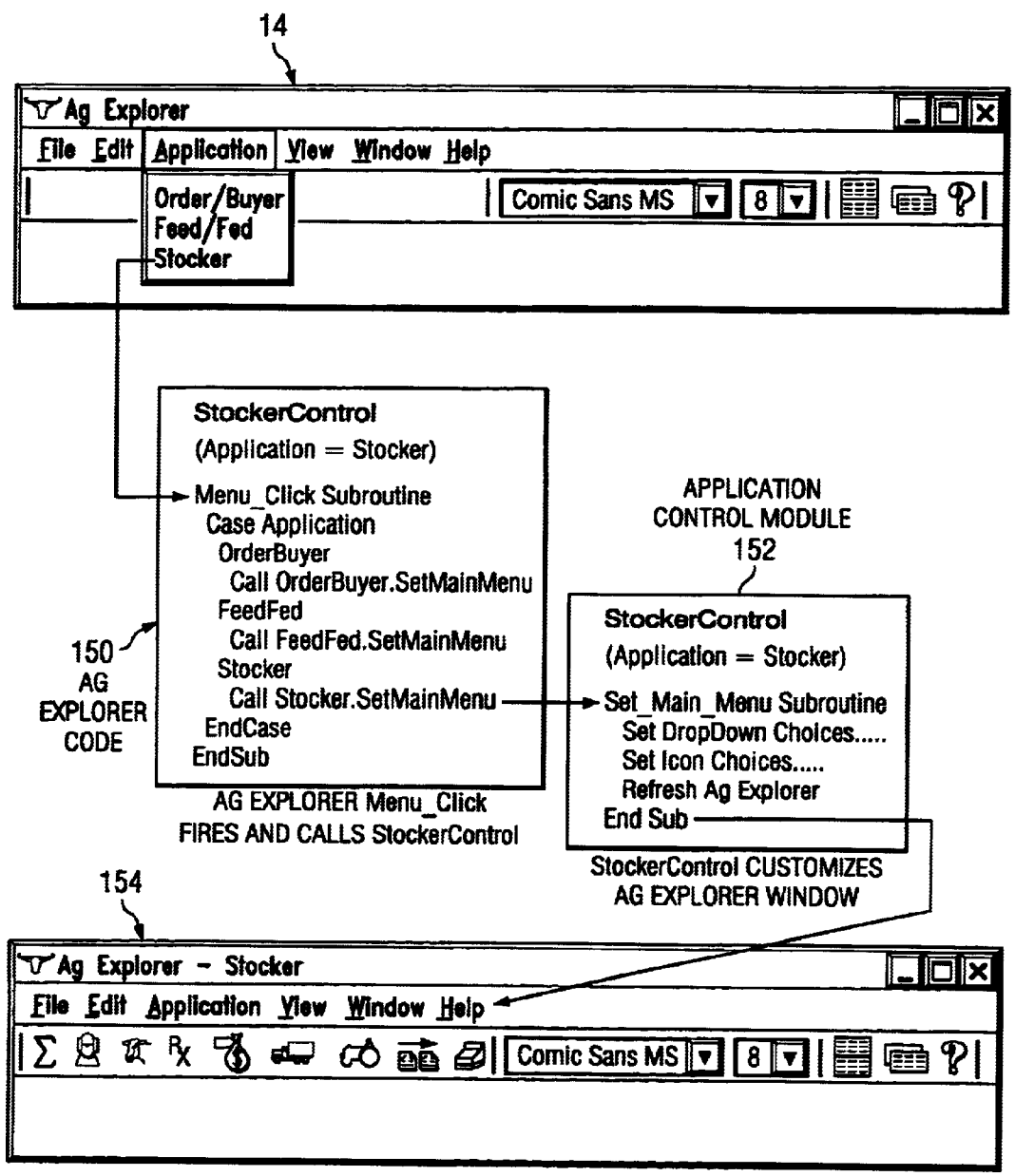
FIG. 11 is a diagram showing an embodiment of selecting a business application environment according to the teachings of the present invention.

Control and processing modules 18 (FIG. 1) also plays an important role in allowing the user to select the specific business application environment he/she desires to view and work with the data. Referring to FIG. 11, a pull-down selection in the menu bar of umbrella agriculture explorer (agriculture explorer) 14 is the business application. An abbreviated exemplary pull-down list for applications shows order-buyer, feed-fed, and stocker applications. When the user selects the stocker application, the Menu_Click subroutine 150 in agriculture explorer 14 calls the Stocker.SetMainMenu function 152 of the stocker application control module. The Stocker.SetMainMenu function sets the menu bar drop-down list selections, the icons, and refreshes the screen to reflect the new business application of stocker. The result, as shown by sample window 154, is a window with a menu bar, tool bar, drop-down lists matching the user-selected business application.

The data in the agriculture explorer database can be exported at user discretion to external business systems. An example would be the export of a purchase invoice to a user's accounting system to allow automated payment and tracking of accounts. The data can be exported to the external database in several ways depending on its type. If external business system makes use of a database that can be directly acessed by via ODBC (Open DataBase Connectivity—most modern databases fall in this category), the application control module can then attach to the database and directly input the new data or changes. The agriculture explorer stores the name and path of the database in the Windows registry, and the database is updated via an update SQL query. This technique requires both an understanding of and access to the external database.

The present invention includes a user-friendly and highly interactive system that provides livestock and materials inventory tracking for various agricultural business applications and transactions. The data is displayed in an easy-to-comprehend manner and the user may narrow the scope of the data displayed in a variety of ways. The hierarchical tree structure organizes the data in a way that is selected by the user, such as by location, ownership, inventory type, etc. The user may also specify the date for which the data is current. The hierarchical tree may have multiple branches having one or more sub-levels. The number of sub-levels in the branches also need not be the same. The tabbed pages provide data summaries and details of the tree node selected by the user. The data may be displayed in a number of ways also selectable by the user. In this manner, the user is able to easily navigate through the data and obtain snap shots of the data presented in meaningful ways according to the selected business application environment.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

APPENDIX A

Explorer Appearance and behavior of right panel as affected by left panel
1. Buyer Explorer
    The tree has three levels:
        All Vendors (or Buyers, or Payees)
        Specific Vendors (or Buyers, or Payees)
        Purchases
    1.1. Invoice Summary Tab
        A one line summary of an invoice
            Top level - 1 line per invoice, all purchase invoices
            Specific Vendor - 1 line per invoice, all of that vendor's purchase invoices
            Purchase - 1 line for that purchase invoice
        1.1.1. Vendor - Who we bought from
        1.1.2. Ref - A reference number
        1.1.3. Inv Date - Date of invoice
        1.1.4. Hd Purch - Number of head purchased
        1.1.5. Hd Placed - Number of head assigned to customer orders
        1.1.6. Hd Avail - Number of head still available to be placed
        1.1.7. Total Cost - Total cost of the group of livestock
        1.1.8. Cost Unapplied - Cost not yet applied to customer orders
        1.1.9. Total Weight - Total weight of the group of livestock
        1.1.10. Avg Wt - Weight per head
        1.1.11. Cost/Cwt - Cost per 100 lbs.
        1.1.12. Cos/Hd - Cost per head
        1.1.13. Description
        1.1.14. Buyer - Who authorized the purchase
        1.1.15. Payee - Who was paid
    1.2. Expense Summary Tab
        One line per type of Expense or type of livestock
            Top level - 1 line per Expense or type of livestock summed across all purchases
            Specific Vendor - 1 line per Expense or type of livestock summed across all of that vendor's purchase invoices
            Purchase - 1 line Expense or type of livestock summed across that purchase invoice
        1.2.1. Expense Type - What type of expense or livestock
        1.2.2. Hd Purch - Number of head purchased
        1.2.3. Hd Placed - Number of head assigned to customer orders
        1.2.4. Hd Avail - Number of head still available to be placed
        1.2.5. Total Cost - Total cost of the group of livestock
        1.2.6. Cost Unapplied - Cost not yet applied to customer orders
        1.2.7. Total Weight - Total weight of the group of livestock
        1.2.8. Avg Wt - Weight per head
        1.2.9. Cost/Hd - Cost per head
        1.2.10. Cost/Cwt - Cost per 100 lbs.
    1.3. Invoice Detail Tab
        A one line per expense or group of livestock on an invoice
            Top level - 1 line per expense for all purchase invoices
            Specific Vendor - 1 line per expense for all of that vendor's purchase invoices
            Purchase - 1 line per expense for that purchase invoice
        1.3.1. Vendor - Who we bought from
        1.3.2. Ref - A reference number
        1.3.3. Inv Date - Date of invoice
        1.3.4. Hd Purch - Number of head purchased
        1.3.5. Hd Placed - Number of head assigned to customer orders
        1.3.6. Hd Avail - Number of head still available to be placed
        1.3.7. Cost - Cost of the expense or group of livestock
        1.3.8. Cost Unapplied - Cost not yet applied to customer orders
        1.3.9. Total Weight - Total weight of the group of livestock

APPENDIX A 1.3.10. Avg Wt - Weight per head
    1.3.11. Cost/Hd - Cost per head
    1.3.12. Cost/Cwt - Cost per 100 lbs.
    1.3.13. Description
    1.3.14. Buyer - Who authorized the purchase
    1.3.15. Payee - Who was paid
    1.3.16. Quality - User subjective description of the quality of the group of livestock
    1.3.17. Details - Notes about the expense or group of livestock
2. Livestock Explorer
    The tree is free form, terminal locations can contain inventory each higher level of the tree contains the locations under it.
    2.1. Livestock Detail Tab
        Detail on current status of livestock. All Livestock in selected group, location, or by owner etc
        2.1.1. Owner
        2.1.2. Location
        2.1.3. Date - Date of record
        2.1.4. Livestock - Sex/Type of Livestock
        2.1.5. In Weight - Initial weight of cattle
        2.1.6. Head
        2.1.7. Weight - Actual weight
        2.1.8. Avg Wt - Actual weight per head
        2.1.9. Est Wt/Hd - estimated weight
        2.1.10. Lbs Fed
        2.1.11. Ration - (Feed Recipe)
        2.1.12. Pasture
        2.1.13. ADG - Average daily gain
        2.1.14. DOF - Days on feed
        2.1.15. DORT - Days on Ration (Feed Recipe)
        2.1.16. Treatment - medical treatment or breeding
        2.1.1. Notes
    2.2. Livestock Summary Tab
        One line summary by type of livestock. Summed by group, location, owner etc.
        2.2.1. Livestock - Sex/Type of Livestock
        2.2.2. Head
        2.2.3. Weight - Actual totat weight
        2.2.4. Avg Wt - Average of Actual weight per head
        2.2.5. Avg Est Wt - Average of Estimated weight per head
        2.2.6. Avg ADG - Average of Average daily gains
        2.2.7. Avg DOF - Average of Days on feed
        2.2.8. Avg DORT - Average Days on Ration (Feed Recipe)
        2.2.1. Notes
    2.3. Livestock History Tab
        All Details by date to display historical trends or events. Selected group, or all groups in selected branch displayed
        2.3.1. Owner
        2.3.2. Location
        2.3.3. Date - Date of record
        2.3.4. Date In - Date cattle received
        2.3.5. Livestock - Sex/Type of Livestock
        2.3.6. In Weight - Initial weight of cattle
        2.3.7. Head
        2.3.8. Weight - Actual weight
        2.3.9. Avg Wt - Actual weight per head
        2.3.10. Est Wt/Hd - estimated weight
        2.3.11. Lbs Fed
        2.3.12. Ration - (Feed Recipe)
        2.3.13. Pasture
        2.3.14. ADG - Average daily gain
        2.3.15. DOF - Days on feed
        2.3.16. DORT- Days on Ration (Feed Recipe)
        2.3.17. Treatment
        2.3.1. Notes
3. Order Explorer
    The tree has three levels:
        All Customers
        Specific Customers
        Orders
    3.1. Order Summary Tab
      A one line summary of an order
        Top level - 1 line per order, all orders
        Specific Customer - 1 line per order, all of that customer's orders
        Order - 1 line for that order
      3.1.1. Customer - Who ordered the livestock
      3.1.2. Reference - Customer purchase order
      3.1.3. Open - if the order is open or filled
      3.1.4. Order Date - When the order was made
      3.1.5. Inv Date - When the order was billed
      3.1.6. Date Modified - Most recent date the order was modified

APPENDIX A
*-continued*

3.1.7. Livestock - Sex/Type of livestock
    3.1.8. Hd Ordered - Number of head ordered
    3.1.9. Min Wt - Minimum desired weight
    3.1.10. Max Wt - Maximum desired weight
    3.1.11. Max Price - maximum acceptable purchase price
    3.1.12. Hd Applied - Number of head applied to fill the order
    3.1.13. Weight - Total Weight of head applied
    3.1.14. Avg weight - Weight per head applied to order
    3.1.15. Cost - Total cost applied to order
    3.1.16. Quality - Quality of livestock desired
    3.1.17. Loads Ordered - how many truck loads the customer wants
    3.1.18. Description
  3.2. Cattle Detail Tab
    A one line for each group of cattle applied to each order
        Top level - 1 line per group of cattle for every orders
        Specific Customer - 1 line per group of cattle for all of that customer's orders
        Order - 1 line per group of cattle for that order
    3.2.1. Customer - Who ordered the livestock
    3.2.2. Reference - Customer purchase order
    3.2.3. Open - if the order is open or filled
    3.2.4. Order Date - When the order was made
    3.2.5. Inv Date - When the order was billed
    3.2.6. Invoice - The invoice number for the purchase of the cattle applied here
    3.2.7. Livestock - Sex/Type of livestock
    3.2.8. Hd Ordered - Number of head ordered
    3.2.9. Date Applied - When this group of cattle was applied to the order
    3.2.10. Head Applied - number of head applied
    3.2.11. Weight - Total Weight of head applied
    3.2.12. Avg Weight - Weight per head applied to order
    3.2.13. Cost - Total cost applied to order
    3.2.14. Quality - Quality of livestock desired
    3.2.15. Description
  3.3. Cost Summary Tab
    A one line for each type of expense or livestock
        Top level - 1 line per type of Expense or livestock summed across all orders
        Specific Customer - 1 line per type of Expense or livestock, summed across all of that customer's orders
        Order - 1 line per type of Expense or livestock Summed across that order
    3.3.1. Expense - Type of Expense or livestock
    3.3.2. Head - Number of head
    3.3.3. Weight - Total Weight of head applied
    3.3.4. Avg Weight - Weight per head applied to order
    3.3.5. Cost - Total cost applied to order
    3.3.6. Cost/Hd - cost per head
    3.3.7. Cost/Cwt - cost per 100 lbs.
  3.4. Cost Detail Tab
    A one line per Expense or group of livestock on an order
        Top level - 1 line per Expense or group of livestock on an order, for all orders
        Specific Customer - 1 line per Expense or group of livestock on an order, for all of that customer's orders
        Order - 1 line per Expense or group of livestock on an order
    3.4.1. Customer - Who ordered the livestock
    3.4.2. Reference - Customer purchase order
    3.4.3. Open - if the order is open or filled
    3.4.4. Expense - Type of Expense or livestock
    3.4.5. Head - Number of head
    3.4.6. Weight - Total Weight of head applied
    3.4.7. Avg Weight - Weight per head applied to order
    3.4.8. Cost - Total cost applied to order
    3.4.9. Cost/Hd - cost per head
    3.4.10. Cost/Cwt - cost per 100 lbs.
    3.4.11. Quality - Quality of livestock desired
    3.4.12. Description
    3.4.13. Invoice - The invoice number for the purchase of the cattle applied here
4. Supply Inventory Explorer
  The tree is free form, terminal locations can contain inventory each higher level of the tree contains the locations under it.
  4.1. Activity Detail Tab
    Complete history. All details for each transaction. Shows all transaction for selected location, or
    all transaction for all locations in the selected branch
    4.1.1. Doc Ref - Reference
    4.1.2. Date
    4.1.3. Status - processed or unprocessed
    4.1.4. Activity - What type of transaction took place
    4.1.5. Source - Where the Supply came from
    4.1.6. Destination - Where the Supply went
    4.1.7. Arrival Date
    4.1.8. Supply Item
    4.1.9. Unit Type -continued

APPENDIX A 4.1.10. Unit Price
    4.1.11. Quantity
    4.1.12. Total Price
  4.2 Current Detail Tab
    Detail on all Supply Items currently still in inventory by location. Shows all at selected location,
    or all at each location in selected branch
    4.2.1. Location
    4.2.2. Supply Item
    4.2.3. In Date
    4.2.4. Arrival Date
    4.2.5. Unit Type
    4.2.6. Quantity
    4.2.7. Lbs/Unit
    4.2.8. Total Lbs
  4.3 Location Summary Tab
    Summary of all Supply Items at each Location. Shows selected location, or all locations in selected branch
    4.3.1. Location
    4.3.2. Supply Item
    4.3.3. Quantity
    4.3.4. Unit Type
    4.3.5. Lbs/Unit
    4.3.6. Total Lbs
  4.4 Supply Item Summary Tab
    Summary of Supply Items. Summed for selected location, or summed across all locations in selected branch
    4.4.1. Supply Item
    4.4.2. Unit Type
    4.4.3. Quantity
    4.4.4. Lbs/Unit
    4.4.5. Total Lbs
  4.5 Inventory Type Summary Tab
    Sum Supply Items by Inventory Type (i.e. hay is a type of Roughage). Summed for selected location,
    or summed across all locations in selected branch
    4.5.1. Inventory type
    4.5.2. Total lbs
5. Supply Usage/Harvest Explorer
  The tree is free form, terminal locations can contain inventory each higher level of the tree contains the locations under it.
  5.1 Activity Detail Tab
    Complete History. All details for each transaction. Shows all transaction for selected location,
    or all transaction for all locations in the selected branch
    5.1.1. Doc Ref - Reference
    5.1.2. Date
    5.1.3. Status - processed or unprocessed
    5.1.4. Source - Where the Supply came from
    5.1.5. Destination - Where the Supply went
    5.1.6. Arrival Date
    5.1.7. Supply Item
    5.1.8. Unit Type
    5.1.9. Unit Price
    5.1.10. Quantity
    5.1.11. Total Price
  5.2 Location Summary Tab
    Summary of all Supply Items at each Location. Shows selected location, or all locations in selected branch
    5.2.1 Location
    5.2.2. Supply Item
    5.2.3. Quantity
    5.2.4. Unit Type
    5.2.5. Lbs/Unit
    5.2.6. Total Lbs
  5.3. Supply Item Summary Tab
    Summary of Supply Items. Summed for selected location, or summed across all locations in selected branch
    5.3.1. Supply Item
    5.3.2. Quantity
    5.3.3. Lbs/Unit
    5.3.4. Total Lbs
  5.4. Inventory Type Summary Tab
    Sum Supply Items by Inventory Type (i.e. hay is a type of Roughage). Summed for selected
    location, or summed across all locations in selected branch
    5.4.1. Inventory type
1. Total lbs

APPENDIX B

The exemplary Cattle Detail query for all orders may be:
  SELECT Associates.Name AS Customer,
  Orders.RefNbr AS Reference, Orders.OrderID,
  Orders.Status AS Open, Orders.DateOpened AS
  [Order Date], Orders.DateInvoiced AS [Inv
  Date], PurchaseInvoices.RefNbr AS Invoice,
  LivestockType.Description AS Livestock,
  Orders.Qty AS [Hd Ordered],
  OrderItem.OrderLiID, OrderItem.InvLiID,
  OrderItem.ActDate AS [Date Applied],
  IIf(OrderItem.Qty Is Null, 0, OrderItem.Qty) AS
  [Hd Applied], IIf (OrderItem.Weight Is Null, 0,
  OrderItem.Weight) AS Weight, IIf(OrderItem.
  Qty > 0, OrderItem.Weight/OrderItem.Qty, 0) AS [Avg
  Wt], IIf(OrderItem.Amount Is Null, 0,
  OrderItem.Amount) AS Cost, Quality.Description
  AS Quality, Orders.Description AS Description,
  True AS LPurchase FROM PurchaseInvoices RIGHT
  JOIN (PurchaseDetail RIGHT JOIN (Quality RIGHT
  JOIN (LivestockType INNER JOIN ((Orders INNER
  JOIN Associates ON Orders.AssocID =
  Associates.AssocID) LEFT JOIN (OrderItem LEFT
  JOIN ExpenseTypes ON OrderItem.ExpenseID =
  ExpenseTypes.ExpenseID) ON Orders.OrderID =
  OrderItem.OrderID) ON
  LivestockType.LivestockType =
  Orders.LivestockType) ON Quality.QualityID =
  OrderItem.QualityID) ON PurchaseDetail.InvLiID =
  OrderItem.InvLiID) ON PurchaseInvoices.InvID =
  PurchaseDetail.InvID WHERE
  (ExpenseTypes.Purchase = True AND
  ExpenseTypes.Livestock = True) ORDER BY
  Associates.Name ASC, Orders.DateOpened ASC,
  OrderItem.ActDate ASC;
The Cost Summary query makes use of a predefined query
called OrderSummary:
  SELECT DISTINCT OrderItem.OrderLiID,
  OrderItem.ExpenseID, OrderItem.Amount,
  Orders.LivestockType,
  IIf(ExpenseTypes.Livestock = True And
  ExpenseTypes.Purchase = True, True, False) AS
  LPurchase, IIf (ExpenseTypes.Purchase = True And
  ExpenseTypes.Livestock = True, OrderItem.Qty,
  OrderItemTotals.TotalApplied) AS Head,
  IIf(ExpenseTypes.Purchase = True And
  ExpenseTypes.Livestock = True,
  OrderItem.Weight, OrderItemTotals.TotalWeight)
  AS Weight, Orders.OrderID, Orders.AssocID,
  Orders.Status
  FROM ExpenseTypes INNER JOIN (Orders INNER JOIN
  (OrderItemTotals INNER JOIN OrderItem ON
  OrderItemTotals.ID = OrderItem.OrderID) ON
  Orders.OrderID = OrderItem.OrderID) ON
  ExpenseTypes.ExpenseID = OrderItem.ExpenseID
  GROUP BY OrderItem.OrderLiID,
  OrderItem.ExpenseID, OrderItem.Amount,
  Orders.LivestockType,
  IIf(ExpenseTypes.Livestock = True And
  ExpenseTypes.Purchase = True, True, False),
  IIf(ExpenseTypes.Purchase = True And
  ExpenseTypes.Livestock = True, OrderItem.Qty,
  OrderItemTotals.TotalApplied),
  IIf(ExpenseTypes.Purchase = True And
  ExpenseTypes.Livestock = True,
  OrderItem.Weight, OrderItemTotals.TotalWeight),
  Orders.OrderID, Orders.AssocID, Orders.Status;
The exemplary Cost Summary query may be:
  SELECT IIf(ExpenseTypes.Livestock = True And
  ExpenseTypes.Purchase =
  True, LivestockType.Description, ExpenseTypes.Description)
  AS Expense, Sum(OrderSummary.Head) AS Head,
  IIf(Sum(OrderSummary.Head) = 0, 0,
  Sum(OrderSummary.Amount)/Sum(OrderSummary.Head))
  AS [Cost/Hd], Sum(OrderSummary.Weight) AS Weight,
  IIf(Sum(OrderSummary.LPurchase) = 0, 0,
  Sum(OrderSummary.Weight)/Sum(OrderSummary.Head)) AS
  [Avg Wt], IIf(Sum(OrderSummary.Weight) = 0, 0,
  Sum(OrderSummary.Amount)/
  Sum(OrderSummary.Weight)*100) AS [Cost/Cwt],
  (OrderSummary.Amount) AS Cost,
  OrderSummary.ExpenseID, OrderSummary.Lpurchase FROM
  (OrderSummary INNER JOIN ExpenseTypes ON
  OrderSummary.ExpenseID = ExpenseTypes.ExpenseID)
  INNER JOIN LivestockType ON
  OrderSummary.LivestockType =
  LivestockType.LivestockType GROUP BY
  IIf(ExpenseTypes.Livestock=True And
  ExpenseTypes.Purchase = True,
  LivestockType.Description,
  ExpenseTypes.Description), ExpenseTypes.ExpenseID,
  OrderSummary.Lpurchase ORDER BY
  OrderSummary.ExpenseID;
The exemplary Cost Detail query used a predefined query
called OrderItemTotals:
  SELECT OrderItem.OrderID AS ID,
  Sum(IIf(ExpenseTypes.Purchase = True AND
  ExpenseTypes.Livestock = True, OrderItem.Qty, 0)) AS
  TotalApplied,
  Sum(IIf(ExpenseTypes.Purchase = True AND
  ExpenseTypes.Livestock = True,
  OrderItem.Weight, 0)) AS TotalWeight,
  Sum(OrderItem.Amount) AS TotalAmount,
  Max(OrderItem.ActDate) AS LatestDate
  FROM ExpenseTypes INNER JOIN OrderItem ON
  ExpenseTypes.ExpenseID = OrderItem.ExpenseID
  GROUP BY OrderItem.OrderID;
The exemplary Cost Detail query may be:
  SELECT Associates.Name AS Customer,
  Orders.RefNbr AS Reference, Orders.Status AS
  Open, IIf((ExpenseTypes.Purchase = True AND
  ExpenseTypes.Livestock=True),
  LivestockType.Description, ExpenseTypes.Description) AS
  Expense, OrderItem.OrderLiID,
  OrderItem.InvLiID, (IIf(OrderItem.Qty > 0,
  OrderItem.Qty, OrderItemTotals.TotalApplied))
  AS Head, IIf(OrderItemTotals.TotalApplied > 0,
  (OrderItem.Amount/(IIf(OrderItem.Qty > 0,
  OrderItem.Qty, OrderItemTotals.TotalApplied))),
  0) AS [Cost/Hd], (IIf(OrderItem.Weight > 0,
  OrderItem.Weight, OrderItemTotals.TotalWeight))
  AS Weight, IIf((ExpenseTypes.Purchase = True
  AND ExpenseTypes.Livestock = True),
  IIf(OrderItem.Qty > 0,
  OrderItem.Weight/OrderItem.Qty, 0), 0) AS Avg
  Wt, IIf(OrderItemTotals.Totalweight > 0,
  (100*OrderItem.Amount/(IIf(OrderItem.Weight >
  0, OrderItem.Weight,
  OrderItemTotals.TotalWeight))), 0) AS
  [Cost/Cwt], OrderItem.Amount AS Cost,
  Orders.Qty AS HdOrd, Orders.OrderID AS OrderID,
  OrderItem.ExpenseID, Quality.Description AS
  Quality, Orders.Description AS Description,
  IIf(ExpenseTypes.Purchase = True AND
  ExpenseTypes.Livestock = True,True,False) AS
  LPurchase, PurchaseInvoices.RefNbr AS Invoice
  FROM PurchaseInvoices RIGHT JOIN
  (PurchaseDetail RIGHT JOIN (Quality RIGHT JOIN
  (Associates INNER JOIN ((Orders INNER JOIN
  LivestockType Orders.LivestockType =
  LivestockType.LivestockType) INNER JOIN
  ((OrderItem LEFT JOIN ExpenseTypes ON
  OrderItem.ExpenseID = ExpenseTypes.ExpenseID)
  LEFT JOIN OrderItemTotals OrderItem.OrderID =
  OrderItemTotals.ID) ON Orders.OrderID =
  OrderItem.OrderID) ON Associates.AssocID =
  Orders.AssocID) ON Quality.QualityID =
  OrderItem.QualityID) ON PurchaseDetail.InvLiID =
  OrderItem.InvLiID) ON PurchaseInvoices.InvID =
  PurchaseDetail.InvID ORDER BY Associates.Name
  ASC, Orders.DateOpened ASC, Orders.OrderID ASC,
  ExpenseTypes.Description ASC;

What is claimed is:

1. An interactive graphical user interface of a livestock and materials inventory system, comprising:
   at least one selectable inventory view;
   a first window operable to display a hierarchical tree structure of selectable nodes each respectively associated with a portion of inventory data maintained in a database, the hierarchical tree structure displayed according to a selected inventory view; and
   a second window operable to display a data summary associated with a selected node in the hierarchical tree structure, the displayed data summary comprising inventory data associated with the selected node and any child nodes in any branches of the selected node.

2. The graphical user interface, as set forth in claim 1, wherein each node in the hierarchical tree structure is associated with the displayed inventory data in the second window, so that a user may manipulate the inventory data by manipulating the nodes or displayed data summary.

3. The graphical user interface, as set forth in claim 1, wherein each node in the hierarchical tree structure is associated with the displayed inventory data in the second window, so that a user may drag a source node and its associated data and drop on a target node and its associated data the data of the source node being associated with the data of the target node to complete a business transaction.

4. The graphical user interface, as set forth in claim 1, wherein each node in the hierarchical tree structure is associated with the displayed inventory data in the second window and displayed items of the data summary are each associated with the inventory data so that a user may drag a source node and its associated data and drop on an item of a target data summary and its associated data the data of the source node being associated with the data of the target data summary item to complete a business transaction.

5. The graphical user interface, as set forth in claim 1, wherein each node in the hierarchical tree structure is associated with the displayed inventory data in the second window and items of the displayed data summary are each associated with the inventory data, so that a user may drag a source data summary item and its associated data and drop on a target node and its associated data, the data of the source data summary item being associated with the data of the target node to complete a business transaction.

6. The graphical user interface, as set forth in claim 1, further comprising a pull-down selection of display criteria for the hierarchical tree structure and the data summary.

7. The graphical set interface as set forth in claim 1, further comprising a clickable icon display criteria for the hierarchical wee structure and the data summary.

8. The graphical user interface, as set forth in claim 1, wherein the hierarchical tee structure comprises:
   a top node;
   one or more branch nodes;
   zero or more levels of sub-branch nodes linked to each branch node; and
   zero or more leaf nodes linked to each sub-branch node.

9. The graphical user interface, as set forth in claim 8, wherein each node is operable to be expanded to show levels below the node or collapsed to hide the levels below the node.

10. The graphical user interface, as set forth in claim 1, wherein the data summary displayed in the second window comprises a graphical representation of data.

11. The graphical user interface, as set forth in claim 1, wherein the data summary displayed in the second window comprises a chart or graph.

12. The graphical user interface, as set forth in claim 1, wherein the data summary displayed in the second window comprises a pictorial image.

13. The graphical user interface, as set forth in claim 1, wherein the data summary displayed in the second window comprises a map.

14. The graphical user interface, as set forth in claim 1, wherein the data summary displayed in the second window comprises a video and/or audio steam.

15. The graphical user interface, as set forth in claim 1, wherein the data summary displayed in the second window comprises data presented in a tabular or grid format.

16. The graphical user interface as set forth in claim 1, wherein the first window is operable to display livestock inventory data by geographical location in the hierarchical tree structure upon selection of a geographical inventory view, and the displayed data summary of the second window is associated with one or more selected geographic locations in the hierarchical tree structure.

17. The graphical user interface, as set forth in claim 1, wherein the first window is operable to display livestock inventory data by geographical location in the hierarchical tree structure, the hierarchical tree structure having a top node indicative of country, a first sub-level indicative of states, a second sub-level indicative of regions in a state, and a third sub-level indicative of ranches and pastures holding the livestock.

18. The graphical user interface, as set forth in claim 1, wherein the first window is operable to display livestock inventory data by ownership in the hierarchical tree structure upon selection of an ownership inventory view, and the displayed data sums of the second window is associated with one or mote selected owners in the hierarchical tree structure.

19. The graphical user interface, as set forth in claim 1, wherein the first window is operable to display inventory data by type of inventory in the hierarchical tree structure, and the displayed data summary of the second window is associated with one or more selected inventory types in the hierarchical tree structure upon selection of a type inventory view.

20. The graphical user interface, as set forth in claim 1, wherein the first window is operable to display customer data in the hierarchical use structure, and the displayed data summary of the second window is associated with one or more selected customers in the hierarchical term structure upon selection of a customer data inventory view.

21. The graphical user interface, as set fort in claim 20, wherein the displayed customer data comprises customer orders.

22. The graphical user interface, as set forth in claim 1, wherein the first window is operable to display vendor data in the hierarchical tree structure, and the displayed data summary of the second window is associated with one or mote selected vendor in the hierarchical tree structure upon selection of a vendor data inventory view.

23. The graphical user interface, as set forth in claim 1, wherein the first window is operable to display buyer data in the hierarchical tree structure, and the displayed data summary of the second window is associated with one or more selected buyer in the hierarchical tree structure upon selection of a buyer data inventory view.

24. The graphical user interface, as set forth in claim 1, wherein the first window is operable to display buyer, vendor or livestock type in the hierarchical tree structure, and the displayed data summary of the second window is associated with one or more selected buyer, vendor or livestock type in the hierarchical tree structure.

25. The graphical user interface, as set forth in claim 1, further comprising a menu bar having a pull-down list of business application environments.

26. The graphical user interface, as set forth in claim 1, further comprising a tool bar having a plurality of icons each representing a data explorer having access to particular predetermined portions of the inventory data of the database.

27. The graphical user interface, as set forth in claim 1, further comprising a plurality of dialog windows each operable to be displayed to receive data specific to a business application transaction.

28. The graphical user interface, as set forth in claim 1, wherein the first and second windows are associated with a first data explorer, the graphical user interface further comprising:
   a third window operable to display a hierarchical tree structure representation of inventory data associated with a second data explorer; and
   a fourth window operable to display a data summary associated with a selected node in the hierarchical tree structure of the third window.

29. The graphical user interface, as set forth in claim 1, wherein the first and second windows are associated with a first data explorer, the window further comprising multiple additional data explorers, each data explorer also having a respective first window operable to display a hierarchical tee structure displaying data associated with the data explorer, and a respective second window operable to display a data summary associated with a selected node in the hierarchical tree structure.

30. The graphical user interface, as set forth in claim 1, further comprising stored visual attributes changeable by a user and associated with visual characteristics of the first and second windows.

31. The graphical user interface, as set forth in claim 1, wherein the data summary is selectable from a plurality of data summaries each respectively comprising at least one of a detail, aggregate, summarization, or calculation of livestock inventory data.

32. The graphical user interface, as set forth in claim 31, wherein each of the plurality of data summaries comprises a labeled tab indicative of the type of data summary displayed therein.

33. The graphical user interfacer as set forth in claim 1, wherein the at least one selectable inventory views comprises a plurality of selectable inventory views.

34. A livestock and material inventory system, comprising:
   a database storing inventory data; and
   a graphical user interface comprising:
      a first window operable to display a hierarchical tree structure of selectable nodes respectively associated with the inventory data and allow a user to select an inventory view of the inventory data; and
      a second window operable to display a data summary associated with a selected node in the inventory view, the data summary comprising inventory data associated with a selected node and any child nodes of any branches of the selected node.

35. The system, as set forth in claim 34, wherein each node in the hierarchical tree structure is associated with the displayed inventory data in the second window, so that a user may manipulate the inventory data by manipulating the nodes or displayed data summary.

36. The system, as set forth in claim 34, wherein each node in the hierarchical tree structure is associated with the displayed inventory data in the second window, so that a user may drag a source node and its associated data and drop on a target node and its associated data, the data of the source node being associated with the data of the target node to complete a business transaction.

37. The system, as set forth in claim 34, wherein each node in the hierarchical tree structure is associated with the displayed inventory data in the second window and items of the displayed data summary are each associated with the inventory data, so that a user may drag a source node and its associated data and drop on a target data summary item and its associated data, the data of the source node being associated with the data of the target data summary item to complete a business transaction.

38. The system, as set forth in claim 34, wherein each node in the hierarchical tree structure is associated with the displayed inventory data in the second window and items of the displayed data summary am each associated with the inventory data, so that a user may drag a source data summary item and its associated data and drop on a target node and its associated data, the data of the source data summary item being associated with the data of the target node to complete a business transaction.

39. The system, as set forth in claim 34, wherein the graphical user interface further comprises a pull-down selection of display criteria for the hierarchical tree structure and the data summary.

40. The system, as set forth in claim 34, wherein the graphical user interface further comprises a clickable icon display criteria for the hierarchical tree structure and the data summary.

41. The system, as set forth in claim 34, wherein the hierarchical tree structure comprises:
   a top node;
   one or more branch nodes;
   zero or more levels of sub-branch nodes linked to each branch node: and
   zero or more leaf nodes linked to each sub-branch node.

42. The system, as set forth in claim 34, wherein the first window is operable to display livestock inventory data by geographical location in the hierarchical tree structure, the displayed data summary of the second window associate with one or more selected geographical locations in the hierarchical tree structure.

43. The system, as set forth in claim 34, wherein the first window is operable to display livestock inventory data by geographical location in the hierarchical tree structure, the hierarchical tree structure having a top node indicative of country, a first sub-level indicative of states, a second sub-level indicative of regions in a state, and a third sub-level indicative of ranches and pastures holding the livestock.

44. The system, as set forth in claim 34, wherein the first window is operable to display livestock inventory data by ownership in the hierarchical tree structure, the displayed data summary of the second window associated with one or more selected owners in the hierarchical tree structure.

45. The system, as set forth in claim 34, wherein the first window is operable to display inventory data by type of inventory in the hierarchical tree structure, and the displayed data summary of the second window associated with one or mom selected inventory types in the hierarchical tree structure.

46. The system, as set forth in claim 34, wherein the first window is operable to display customer data in the hierarchical tree structure, and the displayed data summary of the second window associated with one to more selected customer in the hierarchical tree structure.

47. The system, as set forth in claim 46, wherein the displayed customer data comprises customer orders.

48. The system, as set forth in claim 34, wherein the first window is operable to display vendor data in the hierarchical tree structure, and the displayed data summary of the second window associated with one or more selected vendor in the hierarchical tree structure.

49. The system, as set forth in claim 34, wherein the first window is operable to display buyer data in the hierarchical tee structure, and the displayed data summary of the second window associated with one or more selected buyer in the hierarchical tree structure.

50. The system, as set forth in claim 34, wherein the first window is operable to display buyer, vendor or livestock type in the hierarchical tree structure, and the displayed data summary of the second window is associated with one or more selected buyer, vendor or livestock type in the hierarchical tree structure tree structure.

51. The system, as set forth in claim 34, wherein the graphical user interface further comprises a menu bar having a pull-down list of business application environments.

52. The system, as set forth in claim 34, wherein the graphical user interface further comprises a tool bar having a plurality of icons each representing a data explorer having access to particular predetermined portions of the inventory data of the database.

53. The system, as set forth in claim 34, wherein the graphical user interface further comprises a plurality of dialog windows each operable to be displayed to receive data specific to a business application transaction.

54. The system, as set forth in claim 34, wherein the first and second windows are associated with a first data explorer, the graphical user interface further comprising multiple additional data explorers, each data explorer respectively having a first window operable to display a hierarchical tree structure displaying data associated with the data explorer, and a respective second window operable to display a data summary associated with the selected node in the hierarchical tree structure of the respective first window.

55. The system, as set forth in claim 34, further comprising a generic data explorer object, the generic data explorer object comprising a generic set of graphical user interface properties and a set of explorer control modules operable to generate instances of data explorers having specific functionality.

56. The system, as set forth in claim 34, further comprising a livestock data explore operable to access livestock inventory data stored in the database, display the livestock inventory data in the hierarchical tree structure in the first window, and the displayed data summary comprising livestock inventory data associated with the selected node in the hierarchical tree structure.

57. The system, as set forth in claim 34, comprising an order data explorer operable to access order data associated with customers stored in the database, display the customers in the hierarchical tree structure in the first window and the displayed data summary comprising customer order data associated with the selected node in the hierarchical tree structure.

58. The system, as set forth in claim 34, comprising a buyer data explorer operable to access data associated with invoices stored in the database, display the data in the hierarchical tree structure in the first window, and display invoice data summaries associated with the selected node in the hierarchical tree structure.

59. The system, as set forth in claim 34, comprising a supply inventory data explorer operable to access supply inventory data stored in the database, display the supply inventory data in the hierarchical tree structure in the first window, and the displayed data summary comprising supply inventory data associated with the selected node in the hierarchical tree structure.

60. The system, as set forth in claim 34, comprising a supply usage/harvest data explorer operable to access supply usage and harvest data stored in the database, display the data in the hierarchical tree structure in the first window, and the displayed data summary comprising supply inventory data associated with the selected node in the hierarchical tree structure.

61. The system, as set forth in claim 34, further comprising a set of application control modules each having a set of business rules applicable to the inventory data, so that the data may be associated with and interpreted with respect to a particular business application environment.

62. The system, as set forth in claim 34, further comprising a data exporter operable to access the database and export selected data in a predetermined format.

63. The system, as set forth in claim 34, further comprising at least one data explorer operable to access predetermined portions of data in the database.

64. The system, as set forth in claim 34, wherein the inventory view is selected from a plurality of pre-defined inventory views.

65. The system, as set forth in claim 34, wherein the data summary is selected from a plurality of data summaries each respectively comprising at least one of a detail, aggregate, summarization, to calculation of livestock invention data.

66. The system, as set forth in claim 65, wherein the plurality of data summaries comprises a respective labeled tab indicative of the type of data summary displayed therein.

67. A method of tracking livestock and materials inventory, comprising:
  selecting a business application environment;
  selecting a data explorer having access to specific predetermined sets of data in a database;
  selecting an inventory view from a plurality of inventory views;
  organizing and displaying the accessed data in a hierarchical tree structure comprising a plurality of nodes in a first window according to the selected inventory view and in response to the selected business application environment;
  selecting, in the first window, a node of the hierarchical tree structure;
  selecting a data summary representation in a second window; and
  displaying a data summary associated with the selected node and the selected data summary representation in the second window, the data summary comprising inventory data associated with the selected node and any child nodes below the selected node of any branches of the selected node.

68. The method, as set forth in claim 67, wherein selecting a data explorer comprises instantiating a data explorer having a particular functionality from a generic data explorer object.

69. The method, as set forth in claim 68, wherein instantiating a data explorer comprises executing graphical user interface methods of the generic data explorer object.

70. The method as set forth in claim 67, further comprising associating each node in the hierarchical tree structure with the displayed inventory data in the second window, so that a user may manipulate the inventory data by manipulating the nodes or displayed data summary.

71. The method, as set forth in claim 67, further comprising associating each node in the hierarchical tree structure with the displayed inventory data in the second window, so that a user may drag a source node and its associated data and drop on a target node and its associated data, the data of the source node being associated with the data of the target node to complete a business transaction.

72. The method, as set forth in claim 67, further comprising associating each node in the hierarchical tree structure with the displayed inventory data in the second window and items of the displayed data summary are each associated with the inventory data, so that a user may drag a source node and its associated data and drop on a target data summary item and its associated data, the data of the source node being associated with the data of the target data summary item to complete a business transaction.

73. The method, as set forth in claim 67, further comprising associating each node in the hierarchical tree structure with the displayed inventory data in the second window and items of the displayed data summary are each associated with the inventory data so that a user may drag a source data summary item and its associated data and drop on a target node and its associated data, the data of the source data summary item being associated with the data of the target node to complete a business transaction.

74. The method, as set forth in claim 67, comprising:
  selecting a livestock data explorer operable to access livestock inventory data stored in the database;
  displaying the livestock inventory data by at least one selection criteria in the hierarchical tree structure in the first window; and
  displaying livestock inventory data summaries associated with the selected node in the hierarchical tree structure.

75. The method as set forth in claim 67, comprising:
  selecting an order data explorer operable to access order data associated with customers stored in the database;
  displaying the customers by at least one selection criteria in the hierarchical tree structure in the first window; and
  displaying customer order data summaries associated with the selected node in the hierarchical tree structure.

76. The methods as set forth in claim 67, comprising:
  selecting a buyer data explorer operable to access data associated with invoices stored in the database;
  displaying buyer data by at least one selection criteria in the hierarchical tree structure in the first window; and
  displaying invoice data summaries associated with the selected node in the hierarchical tree structure.

77. The method as set forth in claim 67, comprising:
  selecting a supply inventory data explorer operable to access supply inventory data stored in the database;
  displaying the supply inventory data by at least one selection criteria in the hierarchical tree structure in the first window; and
  displaying supply inventory data summaries associated with the selected node in the hierarchical tree structure.

78. The method, as set forth in claim 67, comprising:
  selecting a supply usage/harvest data explorer operable to access supply usage and harvest data stored in the database;
  displaying the supply usage and harvest data by at least one selection criteria in the hierarchical tree structure in the first window; and
  displaying supply inventory data summaries associated with the selected node in the hierarchical tree structure.

79. The method, as set forth in claim 67, further comprising:
  selecting a second data explorer having access to specific predetermined data of the database;
  organizing and displaying the accessed data in a second hierarchical tree structure in a third window following a selected organizational criteria;
  selecting a node of the second hierarchical tree structure in the third window; and
  displaying data summaries associated with the selected node of the second hierarchical tree structure in a fourth window.

80. The method, as set forth in claim 67, further comprising:
  selecting a first displayed item in the first or second window as a data source;
  dragging the selected data source;
  dropping the selected data source onto a second displayed item in the first or second window as a data target; and
  associating data related to the selected data source with the data target to complete a business transaction.

81. The method, as set forth in claim 80, further comprising:
  checking the suitability of displayed elements passed over by the dragged data source as a possible data target; and
  displaying a drag icon indicative of the suitability of the displayed elements.

82. The method, as set forth m claim 67, further comprising:
  selecting a second data explorer having a first and second windows also displaying a hierarchical tree structure and data summaries, respectively;
  selecting a first displayed item in the first or second window of the first data explorer as a data source;
  dragging the selected data source;
  dropping the selected data source onto a second displayed item in the first or second window of the second data explorer as a data target; and
  associating data related to the selected data source with the data target to complete a business transaction.

83. The method, as set forth in claim 82, further comprising:
  displaying a dialog box having a plurality of data fields;
  filling in selected data fields with appropriate data from the data source and the data target;
  receiving additional data associated with the completed transaction; and
  receiving modified data in filled data fields associated with the completed transaction.

84. The method, as set forth in claim 67, further comprising exporting data associated with the selected node in a predetermined format.

85. The method, as set forth in claim 67, wherein displaying a data summary comprises displaying a graphical representation of the data.

86. The method, as set forth in claim 67, wherein displaying a data summary comprises displaying a chart or graph.

87. The method, as set forth in claim 67, wherein displaying a data summary comprises displaying a map.

88. The method, as set forth in claim 67, wherein displaying a data summary comprises displaying a pictorial image.

89. The method, as set forth in claim 67, wherein displaying a data summary comprises displaying a video and/or audio stream.

* * * * *